US012386312B2

(12) United States Patent
Tahara

(10) Patent No.: US 12,386,312 B2
(45) Date of Patent: Aug. 12, 2025

(54) IMAGE REPRODUCTION DEVICE, HOLOGRAM RECORDING DEVICE, AND DIGITAL HOLOGRAPHY DEVICE

(71) Applicant: National Institute of Information and Communications Technology, Tokyo (JP)

(72) Inventor: Tatsuki Tahara, Toyko (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 403 days.

(21) Appl. No.: 18/044,477

(22) PCT Filed: Sep. 9, 2021

(86) PCT No.: PCT/JP2021/033220
§ 371 (c)(1),
(2) Date: Mar. 8, 2023

(87) PCT Pub. No.: WO2022/054888
PCT Pub. Date: Mar. 17, 2022

(65) Prior Publication Data
US 2023/0359147 A1    Nov. 9, 2023

(30) Foreign Application Priority Data

Sep. 10, 2020   (JP) ................................ 2020-152433

(51) Int. Cl.
*G03H 1/26*        (2006.01)
(52) U.S. Cl.
CPC ... *G03H 1/2645* (2013.01); *G03H 2001/2655* (2013.01); *G03H 2222/31* (2013.01);
(Continued)

(58) Field of Classification Search
CPC ............. G03H 1/2645; G03H 2222/31; G03H 2225/13; G03H 2225/32; G03H 2226/11;
(Continued)

(56) References Cited

U.S. PATENT DOCUMENTS

2021/0255584 A1*   8/2021   Choi .................... H04N 23/843

FOREIGN PATENT DOCUMENTS

JP           2015001726 A   *   1/2015
JP           2017076038 A       4/2017
(Continued)

OTHER PUBLICATIONS

International Search Report and Written Opinion pertaining to PCT/JP2021/033220, mailed Nov. 30, 2021.
(Continued)

*Primary Examiner* — Arnel C Lavarias
(74) *Attorney, Agent, or Firm* — GRUMBLES LAW PLLC

(57) ABSTRACT

An image reproduction device reproduces an image including N different parameters of a wavelength range or the like, and includes: a multiple hologram acquisition part that acquires N to 2N multiple holograms obtained by multiplex-recording interference patterns for each parameter; a parameter selection part that selects the parameters one by one; a hologram generation part that generates a computer generated hologram containing two lightwaves having the selected parameter, from the multiple hologram; and a lightwave restoration part that restores one of the two lightwaves from the computer generated hologram.

11 Claims, 20 Drawing Sheets

(52) U.S. Cl.
CPC ..... *G03H 2225/13* (2013.01); *G03H 2225/32* (2013.01); *G03H 2226/11* (2013.01)

(58) Field of Classification Search
CPC ............. G03H 2001/2655; G03H 1/00; G03H 1/0005; G03H 2001/005; G03H 1/02; G03H 2001/0224; G03H 2001/0228; G03H 1/04; G03H 1/0443; G03H 2001/0447; G03H 2001/045; G03H 1/10; G03H 1/16; G03H 1/22; G03H 1/26; G03H 1/30; G03H 2225/12
USPC .............. 359/9, 1, 10, 11, 22, 25, 29, 32, 35
See application file for complete search history.

(56) References Cited

FOREIGN PATENT DOCUMENTS

| | | | |
|---|---|---|---|
| JP | 2019219523 A | 12/2019 | |
| WO | 2015040925 A1 | 3/2015 | |

OTHER PUBLICATIONS

Liu et al., "Two-step-only quadrature phase-shifting digital holography", Optics Letters, vol. 34, No. 3, 2009, 250-252.

Tahara et al., "Four-step phase-shifting digital holography simultaneously sensing dual-wavelength information using a monochromatic image sensor", J. Opt. 17, 2015, 1-10.

Wu et al., "Single-shot lensless imaging with fresnel zone aperture and incoherent illumination", Light Science & Applications, 2020, 9:53, 1-11.

\* cited by examiner ( 0, 0, 0 )

( (434/360)×2π, 3π, 4π )

( −(217/360)×2π, −3π/2, −2π )

( (217/360)×2π, 3π/2, 2π )

( −(434/360)×2π, −3π, −4π )

( (217/360)×π/2, 3π/8, π/2 )

( 618 nm )  ( 545 nm )

( 618 nm )  ( 545 nm )

( 618 nm )  ( 545 nm )

IMAGE REPRODUCTION DEVICE, HOLOGRAM RECORDING DEVICE, AND DIGITAL HOLOGRAPHY DEVICE

CROSS REFERENCE TO RELATED APPLICATION

This application is a National Stage Application of PCT/JP2021/033220, filed on Sep. 9, 2021, and which application is incorporated herein by reference. To the extent appropriate, a claim of priority is made to the above disclosed application.

TECHNICAL FIELD

The present invention relates to an image reproduction device, a hologram recording device, and a digital holography device.

BACKGROUND ART

Information on optical property such as a wavelength of light and polarization is widely used in a variety of forms as a useful feature. The information is used in, for example: discriminating a molecular composition using an optical microscope including a fluorescence microscope; obtaining a variety of information on orientation or localization of a biological polymer without staining; obtaining vital signs of a living body such as a health state; estimating how a product or a material is deteriorated; estimating a type or a property of a substance or a material; and recognizing or discriminating an object by a human eye or a robot vision. One of proposed techniques of acquiring optical information is, instead of a conventional technique using a color filter array of R, G, and B or a polarizing filter, the multidimension sensing which includes a signal processing based on computational coherent multiplexing and uses not absorption of light but phase modulation, so as to obtain a clear image by improving light efficiency (see Patent Document 1). Patent Document 1 discloses, for example, as a technique of acquiring information on wavelength, digital holography technology in which: an image pickup device multiplex-records interference patterns of each of R, G, and B lights, from which a multiple hologram is obtained; and a three-dimensional image is reproduced therefrom by performing a signal processing.

Patent Document 1 discloses that, in order to represent an image containing light in three wavelength ranges, namely, R, G, and B, six multiple holograms are prepared, number of which is twice as many as the three wavelength ranges. Further, Patent Document 1 is designed on the assumption that an intensity of one of two lightwaves forming each of interference patterns be acquired independently. Another technique is also disclosed in which: a specific two-step phase-shifting interferometry is used for acquiring an intensity of a lightwave on one side forming interfering light independently from light in (N−1) wavelength ranges; and information on an image in each wavelength range can be thereby obtained from 2N multiple holograms (see Non-Patent Document 1). Another two-step phase-shifting interferometry is considered to be applicable to the method disclosed in Non-Patent Document 1, in which measurement of an intensity of one of two lightwaves forming interfering light is not necessary (see Non-Patent Document 2). It is assumed in Patent Document 1 and Non-Patent Document 1 that, so as to generate a lightwave forming an interference pattern of at least one multiple hologram, an integral multiple of $2\pi$ is given to an amount of phase modulation. Meanwhile, a technique of performing a spectroscopic signal processing in a given amount of phase modulation is proposed (Patent Document 2).

Non-Patent Document 3 discloses a method of separating an object light as a one-order diffraction light component, from a conjugate image as a zero-order diffraction light intensity distribution and a minus-one-order diffraction light component, both of which are contained in a recorded hologram, employing compressed sensing. The method can obtain only the object light from the hologram, without using the phase-shifting interferometry.

RELATED ART DOCUMENTS

Patent Documents

Patent Document 1: Japanese Patent No. 6308594
Patent Document 2: Japanese Laid-Open Patent Application, Publication No. 2017-076038

Non-Patent Documents

Non-Patent Document 1: T. Tahara, et al., "Four-step phase-shifting digital holography simultaneously sensing dual-wavelength information using a monochromatic image sensor", Journal of Optics (IOP Publishing) Vol. 17, pp. 125707-1-10, 2015
Non-Patent Document 2: J.-P. Liu and T.-C. Poon, "Two-step-only quadrature phase-shifting digital holography", Optics Letters Vol. 34, pp. 250-252, 2009
Non-Patent Document 3: J. Wu, et al., "Single-shot lensless imaging with fresnel zone aperture and incoherent illumination", Light: Science & Applications Vol. 9, pp. 53-1-11, 2020

SUMMARY OF THE INVENTION

Problems to be Solved by the Invention

In order to reproduce one image containing information on wavelength or the like from a multiple hologram, a plurality of time- or space-divided multiple holograms are required. The larger the number of parameters of the information, the more the multiple holograms required. When a multiple hologram is multiply space-divided, pixels of each of the divided multiple holograms become discrete, which degrades resolution of the reproduced image. Meanwhile, when a multiple hologram is multiply time-divided, that is, a multiple hologram is imaged a plurality of times to thereby obtain time-divided multiple holograms, more time is necessary to take an image per shot, which degrades time resolution. Additionally, when a wavelength range is segmented or polarization is made, information obtained therefrom may include an increased number of parameters, which further degrades space or time resolution. Thus, in the technology of digital holography, there is a need for an image reproduction using a smaller number of multiple holograms. Patent Documents 1 and 2 each disclose a technique of reproducing an image from (2N−1) multiple holograms, when the number of parameters is N. For example, when an image containing three wavelength ranges, namely, R, G, and B (N=3), it is necessary to obtain seven multiple holograms. Patent Document 1 and Non-Patent Document 1 each disclose a technique of reproducing an image from 2N multiple holograms. In the technique, however, when a multiple hologram is recorded, it is necessary to separately record an intensity of a lightwave of each parameter, resulting in the space or time resolution similar to that when at least (2N+1) multiple holograms are recorded. It is thus contemplated that the techniques described above can be further improved.

In light of the above-described problems, the present invention has been made in an attempt to provide an image reproduction device which can reproduce an image containing information on optical property with high-level space and time resolutions, a hologram recording device used for obtaining a multiple hologram for reproducing the image, and a digital holography device equipped with the image reproduction device and the hologram recording device.

Means for Solving the Problems

An image reproduction device of the present invention reproduces, from not less than N and not more than 2N multiple holograms, an image which contains N parameters for each of one or more pieces of optical information selected from a wavelength range, a polarization direction, and a measurement region, or N combinations thereof. The multiple holograms are time- or space-divisionally multiplex-recorded therein N patterns of interference patterns each formed by two lightwaves of which phases are different for each parameter. A phase of at least one of lightwaves of 2N types in total being different from each other. The image reproduction device includes: a parameter selection part configured to select a parameter one by one from the N parameters; a hologram generation part configured to, when the parameter selection part selects the parameter, remove an interference pattern of (N−1) patterns other than an interference pattern formed by two lightwaves having the selected parameter, from at least one of the multiple holograms, and generate a computer generated hologram containing the two lightwaves; and a lightwave restoration part configured to restore one of the two lightwaves from the computer generated hologram generated by the hologram generation part. After the lightwave restoration part restores one or more lightwaves, in order to generate a computer generated hologram containing two lightwaves having a parameter different from the restored lightwave, the hologram generation part uses either or both the lightwave having been restored by the lightwave restoration part and the computer holograms having been used for restoring the lightwave.

Another image reproduction device of the present invention reproduces, from 2N multiple holograms, an image which contains N parameters for each of one or more pieces of optical information selected from a wavelength range, a polarization direction, and a measurement region, or N combinations thereof. The multiple holograms are time- or space-divisionally multiplex-recorded therein N patterns of interference patterns each formed by two lightwaves of which phases are different for each parameter. The image reproduction device includes: a first lightwave restoration part configured to restore, from (2N−1) multiple holograms, lightwaves of (N−1) types as one of two lightwaves forming each of (N−1) patterns of interference patterns other than the N-th interference pattern, the (2N−1) multiple holograms being the 2N multiple holograms other than the 2N-th multiple hologram, the (2N−1) multiple holograms also having a phase of at least one of lightwaves of 2N types forming the N interference patterns; a first hologram generation part configured to, using the lightwave restored by the first lightwave restoration part, remove interference patterns of (N−1) patterns other than the N-th interference pattern, from at least one of the multiple holograms other than the 2N-th multiple hologram, to thereby generate a first computer generated hologram; a second hologram generation part configured to, using the lightwave restored by the first lightwave restoration part, remove interference patterns of (N−1) patterns other than the N-th interference pattern, from the 2N-th multiple hologram, to thereby generate a second computer generated hologram; and a second lightwave restoration part configured to restore one of two lightwaves forming the N-th interference pattern, from the first computer generated hologram and the second computer generated hologram, using phase-shifting technique.

A hologram recording device of the present invention includes: a lightwave generator that generates, from a lightwave of an object, a lightwave having N parameters for each of one or more pieces of optical information selected from a wavelength range, a polarization direction, and a measurement region, or N combinations thereof, the generated lightwave being two or more in number, the two or more lightwaves having respective phases different from each other; and an image pickup device that allows the lightwave generated by the lightwave generator enter therein and multiplex-records two or more patterns of interference patterns formed by two lightwaves having the same parameter and different phases, as a multiple hologram. The two or more patterns of the interference patterns are time- or space-divided and recorded, to thereby record a plurality of multiple holograms. The lightwave has a phase different from at least one of lightwaves forming the two or more patterns of the interference patterns recorded in each of a plurality of the multiple holograms.

A digital holography device of the present invention includes: the hologram recording device; and the image reproduction device.

Advantageous Effects of the Invention

An image reproduction device, a hologram recording device, and a digital holography device of the present invention: can improve light use efficiency; thereby record the minimum number of holograms; and reproduce an image with high-level space and time resolutions, from the minimum number of the recorded holograms.

EMBODIMENTS FOR CARRYING OUT THE INVENTION

Figure 1:
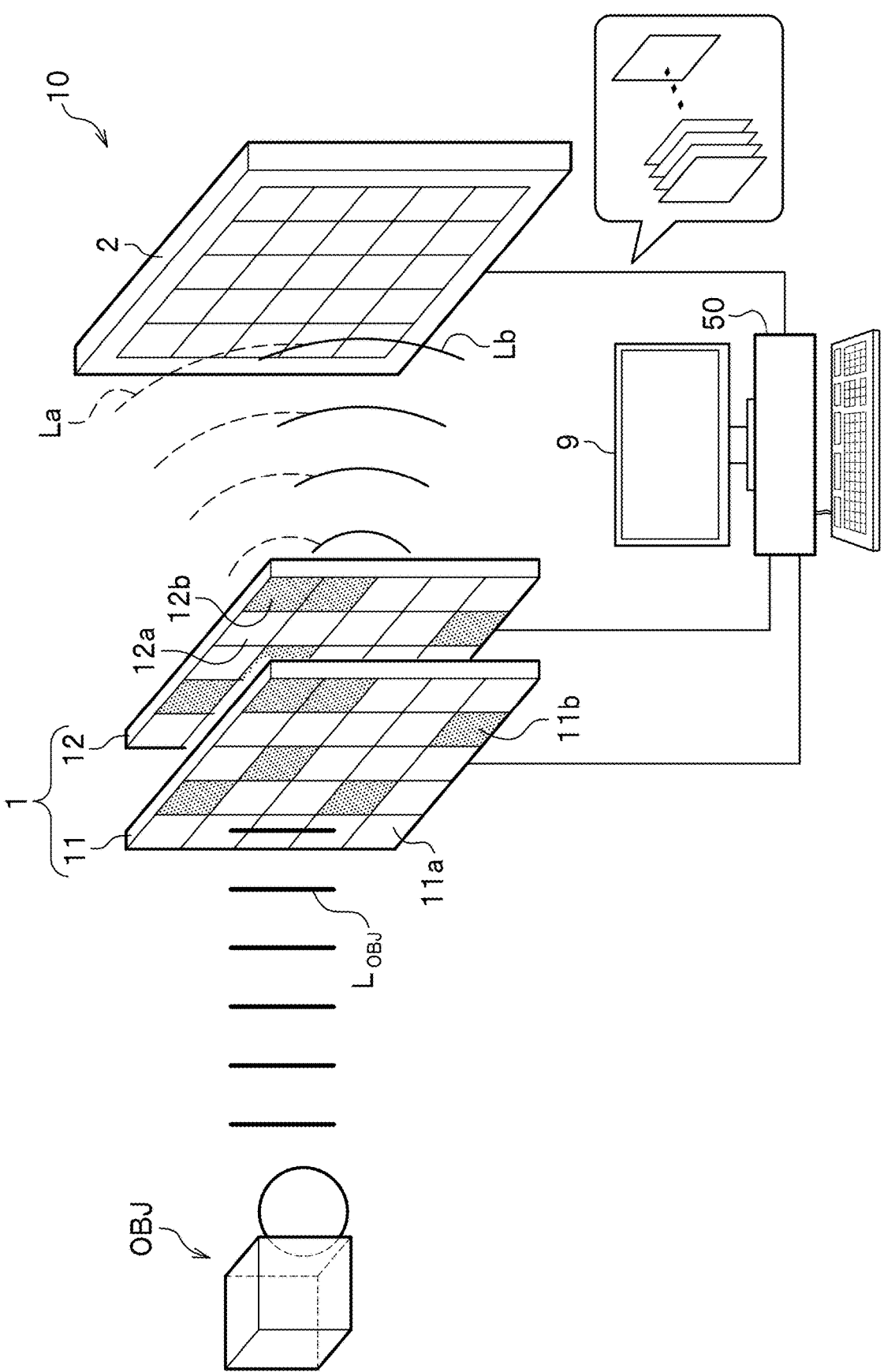
FIG. 1 is a schematic diagram for explaining a structure of a digital holography device according to an embodiment of the present invention.

Embodiments for carrying out an image reproduction device, a hologram recording device, and a digital holography device of the present invention are described with reference to the related drawings. In order to clearly explain the present invention, a size or a positional relationship of a device or a components illustrated in the figure may be exaggerated and a shape thereof may be simplified. Additionally, the same reference numerals are given to the same or similar components in the explanation and description thereof is omitted herefrom.

First Embodiment

As illustrating FIG. 1, a digital holography device 10 according to an embodiment of the present invention includes: a hologram recording device that includes a spatial light phase modulator (which may also be referred to as a lightwave generator) 1 and an image pickup device 2; and a computer 50 that includes an image reproduction device 6 (see FIG. 3) according to the embodiment of the present invention. The hologram recording device includes a recording controller 5 built into the computer 50 (see FIG. 3). The computer 50 is realized by a commercially available personal computer (PC) or the like. In the digital holography device 10, the hologram recording device records light (lightwave) $L_{OBJ}$ from an object (to be imaged) OBJ as N units of multiple hologram s $I_1, I_2, \ldots, I_N$ and the image reproduction device 6 reproduces a multicolor three-dimensional image of an object OBJ from the multiple holograms $I_1, I_2, \ldots, I_N$.

(Hologram Recording Device)

The hologram recording device of the digital holography device 10 realizes a self-interferometer having an in-line optical system. In the hologram recording device, the spatial light phase modulator 1 with light $L_{OBJ}$ incident from the object OBJ thereto generates lightwaves La, Lb having respective phases different from each other; and the image pickup device 2 images interference patterns formed by the lightwaves La, Lb as a hologram. In order to generate the light $L_{OBJ}$ from the object OBJ, the hologram recording device (of the digital holography device 10) further includes a light source (not illustrated) that irradiates the object OBJ with light. In this embodiment, the light $L_{OBJ}$ is light visible and available in a random polarization direction and may not be coherent light. Thus, a light source used herein includes: a generally-available illuminating device such as a white LED (light-emitting diode), a fluorescent lamp, a halogen lamp, a mercury lamp; and sunlight. The light source used herein may be a fluorescent body or a self-luminous body, including autofluorescence, which may also be used as an object OBJ. The light source used herein may be a combination of monochromatic light sources such as R (red), G (green), and B (blue) LEDs, which makes it possible to obtain a multiple hologram having an image with high color reproducibility.

Figure 9:
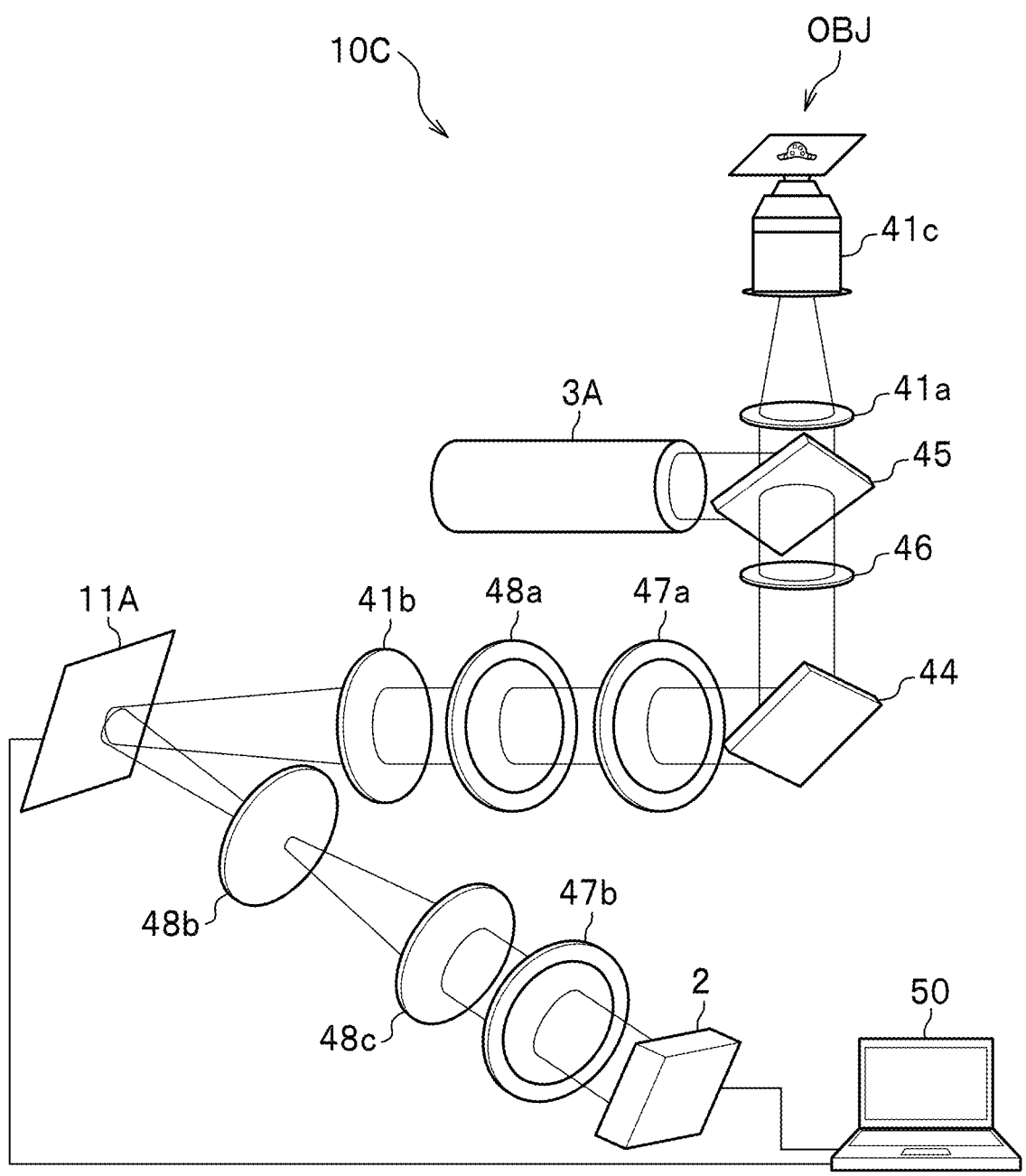
FIG. 9 is a schematic diagram for explaining a structure of a digital holography device equipped with a fluorescence microscope according to the related art.

The spatial light phase modulator 1 is configured by arranging, in a two-dimensional array, light phase modulation elements each shifting a phase of incident light by an amount of shift according to the length of a wavelength of the incident light; and has cells (light phase modulation elements) having amounts of shift different from each other, to the same wavelength. A liquid-crystal spatial light modulator is suitably used as the spatial light phase modulator 1 having the above-described wavelength dependency. The liquid-crystal spatial light modulator, however, modulates a phase of light in a specific polarization direction. Thus, in the related art, a structure as illustrated in FIG. 9 is used, for example. That is, a polarizer 47a is placed on a light incident side of a spatial light phase modulator 11A and make light in one polarization direction (linear polarization) enter the spatial light phase modulator 11A. In the structure, the polarizer 47a absorbs part of the light, resulting in a decrease in light use efficiency. In this embodiment, the spatial light phase modulator 1 is configured by stacking two transmissive liquid-crystal spatial light modulators, namely, a first spatial light phase modulator (a first spatial light phase modulation part) 11 and a second spatial light phase modulator (second spatial light phase modulation part) 12, one on top of the other. Each of the first spatial light phase modulator 11 and the second spatial light phase modulator 12 used herein includes a transmissive liquid-crystal spatial light modulator disposed in a liquid crystal display (LCD) or the like.

Figure 2:
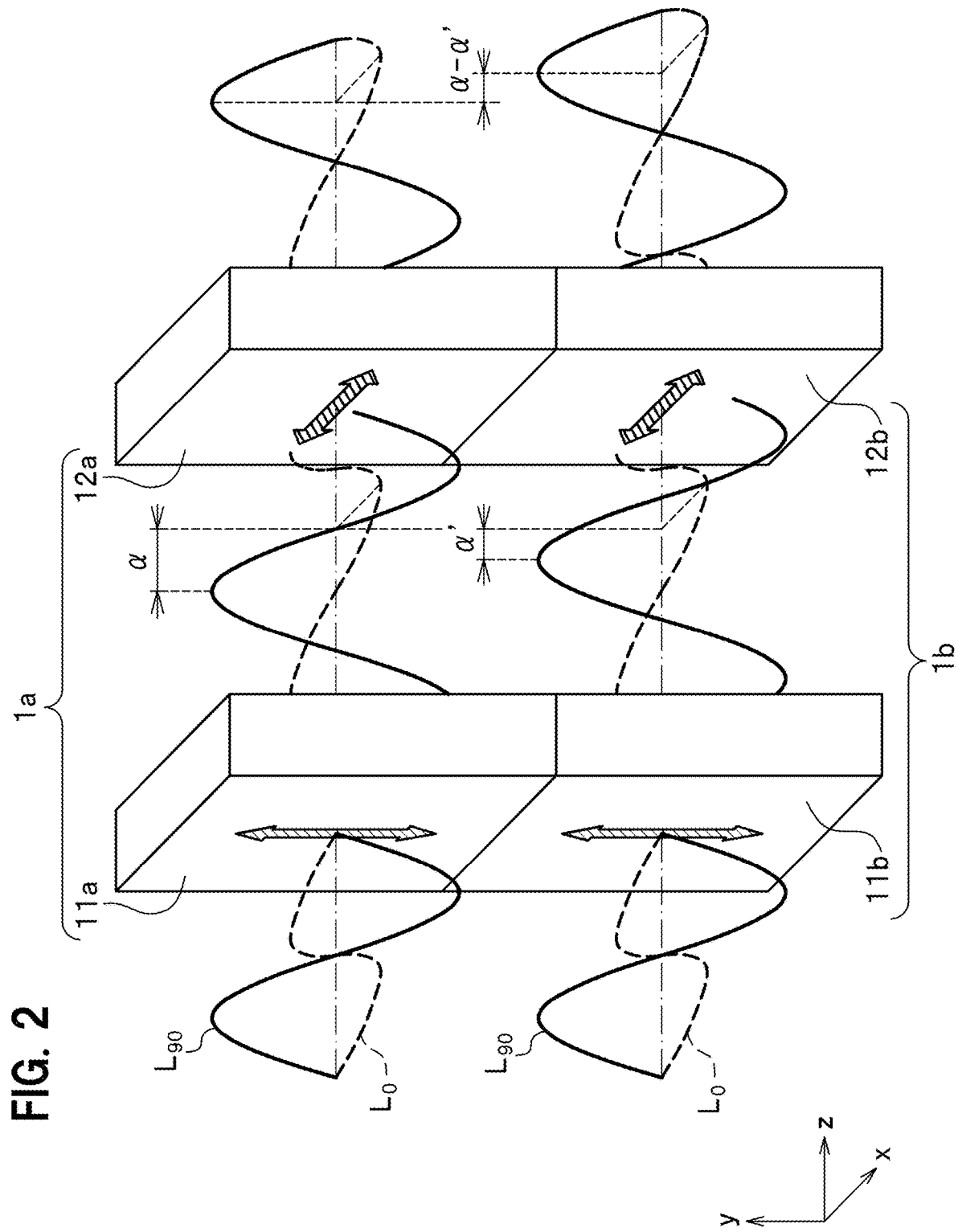
FIG. 2 is a partially enlarged diagram illustrating a part of a spatial light phase modulator of a hologram recording device is schematically enlarged according to an embodiment of the present invention.

The first spatial light phase modulator 11 and the second spatial light phase modulator 12 have the same number of pixels (light phase modulation elements) with the same pixel pitch. Respective polarization directions of light phase-modulated by the modulators 11 and 12 are, however, perpendicular to each other. The polarization direction of the phase-modulated light can be set using, for example, a surface shape of an oriented film of each of the spatial light phase modulators 11, 12. The polarization direction herein is set, as illustrated in FIG. 2, in such a manner that: each of light phase modulation elements 11a, 11b of the first spatial light phase modulator 11 disposed on an incident side of the light $L_{OBJ}$ modulates polarized light (y-polarized) $L_{90}$ which is polarized in the y-direction (90-degree direction); and each of light phase modulation elements 12a, 12b of the second spatial light phase modulator 12 modulates polarized light (x-polarized) $L_0$ which is polarized in the x-direction (0-degree direction). Herein, the first spatial light phase modulator 11 includes two light phase modulation elements having respective amounts of phase shift different from each other, namely, the light phase modulation element 11a and the light phase modulation element 11b, which are randomly arranged. Similarly, the second spatial light phase modulator 12 includes two light phase modulation elements having respective amounts of phase shift different from each other, namely, the light phase modulation element 12a and the light phase modulation element 12b, which are randomly arrayed. The light phase modulation element 11a and the light phase modulation element 12a are, however, placed in the same location, when viewed from above (an incidence plane of the light $L_{OBJ}$) (in a direction of the light axis). Similarly, the light phase modulation element 11b and the light phase modulation element 12b are placed in the same location, when viewed from above. The amounts of phase shift of both the light phase modulation element 11a and the light phase modulation element 12a are set to α. The amounts of phase shift of both the light phase modulation element 11b and the light phase modulation element 12b are set to α' (α≠α'). The amount of phase shift can be controlled by how much voltage is applied to any of the light phase modulation elements. In this embodiment, as described hereinafter, the image pickup device 2 is configured to take an image by performing time-divisional recording a plurality of times. Each time the recording is made, the spatial light phase modulator 1 changes an amount of phase shift of each cell. A high response speed of each of the first and second spatial light phase modulators 11, 12 is thus preferable.

In the structure as described above, the light $L_{OBJ}$ (in FIG. 2, represented by the x-polarized light $L_0$ and the y-polarized light $L_{90}$) which has entered the spatial light phase modulator 1 in a random polarization direction enters the first spatial light phase modulator 11. Only the y-polarized light $L_{90}$ is phase-modulated at the light phase modulation elements 11a, 11b in the amounts of shift, α, α', respectively. This means that the x-polarized light $L_0$ and the y-polarized light $L_{90}$ of the light exiting from the first spatial light phase modulator 11 have respective phases different from each other. When the light then enters the second spatial light phase modulator 12, only the x-polarized light $L_0$ is phase-modulated at the light phase modulation elements 12a, 12b in the amounts of shift, α, α', respectively. As a result, the light that exits from the second spatial light phase modulator 12 (the spatial light phase modulator 1) has the x-polarized light $L_0$ and the y-polarized light $L_{90}$ in the same phase as it originally was. At the same time, the light passing through the light phase modulation elements 11a, 12a has an amount of phase shift different from that passing through the light phase modulation elements 11b, 12b, resulting in a phase difference by |α−α'|. The spatial light phase modulator 1 can thus modulate phase of each of the two-dimensionally arrayed cells, without polarization dependency on light in any polarization directions. In other words, the spatial light phase modulator 1 includes: one or more cells 1a, each of which is composed of the light phase modulation elements 11a, 12a stacked one on top of the other; and one or more cells 1b, each of which is composed of the light phase modulation elements 11b, 12b stacked similarly to the elements 11a, 12a. In the spatial light phase modulator 1, the cell 1a and the cell 1b are randomly arranged. The cell 1a and the cell 1b change phases thereof by amounts of shift α and α', respectively. Note that, ideally, there is no distance between the first spatial light phase modulator 11 and the second spatial light phase modulator 12. Thus, the first spatial light phase modulator 11 and the second spatial light phase modulator 12: are preferably attached firmly to each other; and are more preferably arranged with respective sides of liquid crystal layers thereof opposed to each other.

Light passing through the light phase modulation elements 11a, 12a (the cell 1a) of the spatial light phase modulator 1 forms a lightwave La which is a spherical wave. Meanwhile, light passing through the light phase modulation elements 11b, 12b (the cell 1b) forms a lightwave Lb which is also a spherical wave. Note that FIG. 1 illustrates the lightwave La and lightwave Lb traveling in respective directions different from each other, so as to distinguish one from the other. The directions or the forms thereof are not, however, limited to those described above. The spatial light phase modulator 1 preferably gives a phase distribution of spherical waves not including return waves, to the cell 1a or the cell 1b, in each of which one of the two lightwaves is generated. Giving the phase distribution of spherical waves without return waves makes it possible for the spatial light phase modulator 1 to function as a lens. Additionally, because a lightwave with an unnecessary order is not generated, a higher light use efficiency can be achieved compared with that when a diffraction lens is used. Further, the spatial light phase modulator 1 preferably includes the same or approximately the same number of the cells 1a and the cells 1b. This makes intensities of the lightwave La and the lightwave Lb equal (an intensity ratio of 1) or nearly equal to each other. As described above, the light phase modulation elements 11a, 11b, 12a, 12b of the spatial light phase modulator 1 are dependent on wavelength, light exiting from the spatial light phase modulator 1 thus forms two lightwaves for each wavelength range. In this embodiment, two lightwaves for each of wavelength ranges of R, G, and B, that is, six lightwaves in total, exit from the spatial light phase modulator 1. In the digital holography device 10 according to this embodiment, the number of the wavelength ranges (the number of parameters) may be set to any appropriate number, for example, two, four, and the like. To simplify explanation, FIG. 2 illustrates one wavelength light $L_0$, $L_{90}$ and FIG. 1 illustrates two lightwaves La, Lb of the one wavelength (wavelength range). The term "two lightwaves" used in the specification means two lightwaves having the same parameters (herein, the wavelength range) and different phases.

The image pickup device 2: converts incident light into an electrical signal for each of two-dimensionally arrayed pixels; and outputs the electrical signal. In this embodiment, the image pickup device 2 is realized by a unicolor (monochrome) image sensor which is sensitive to each of R, G, and B contained in the $L_{OBJ}$ from the object OBJ, so as to image each wavelength range thereof without any discrimination. More specifically, the image pickup device 2 is realized by a CMOS (Complementary Metal-Oxide Semiconductor) image sensor having a pixel with a photodiode made of Si having a wide spectral sensitivity including a visible range, or a CCD (Charge Coupled Device) image sensor. Alternatively, the image pickup device 2 is realized by an array of commercially available photodetectors such as electron multipliers. The image pickup device 2 preferably has the number of pixels (cells) equal to or larger than that of the spatial light phase modulator 1 (the first and second spatial light phase modulators 11, 12). In this embodiment, the image pickup device 2 preferably has a high response speed, similarly to those of the first and second spatial light phase modulators 11, 12.

Figure 3:
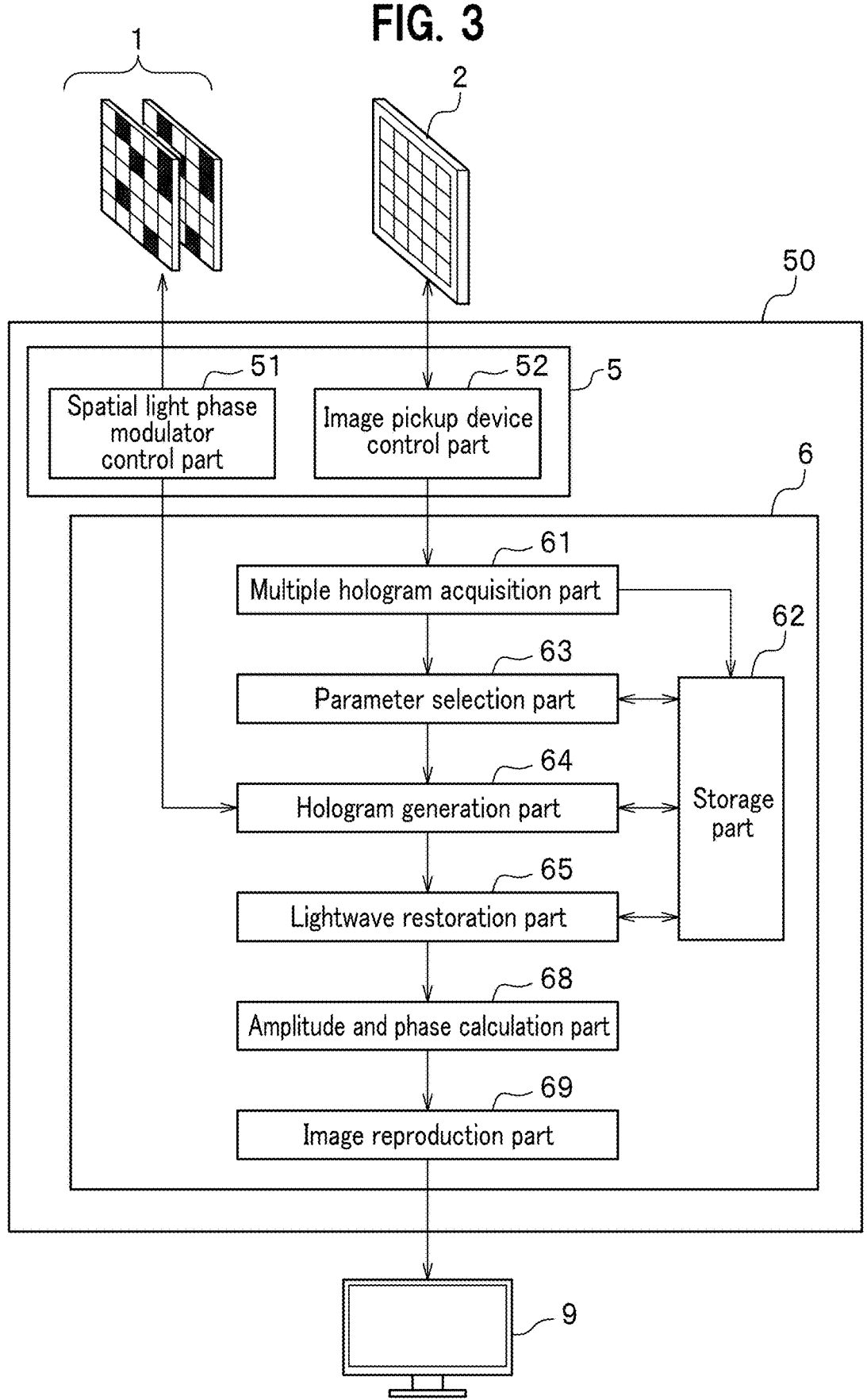
FIG. 3 is a block diagram illustrating a computation part of the digital holography device for explaining a structure of an image reproduction device according to a first embodiment of the present invention.

The recording controller 5 includes, as illustrated in FIG. 3: a spatial light phase modulator control part 51 that drives and controls the spatial light phase modulator 1 (the first and second spatial light phase modulators 11, 12); and an image pickup device control part 52 that drives and controls the image pickup device 2. The recording controller 5 as described above: is realized by a CPU (Central Processing Unit) that performs operations and a flash memory or a RAM (Random Access Memory) each of which stores therein a program or the like for performing the operations; and is included in the computer 50.

(Image Reproduction Device)

The image reproduction device 6 reproduces, from not less than N and not more than 2N multiple holograms, an image which contains N parameters for each of one or more pieces of optical information selected from a wavelength range, a polarization direction, and a measurement region, or N combinations thereof. In the multiple holograms, N patterns of interference patterns each formed by two lightwaves of which phases are different for each parameter are multiplex-recorded time- or space-divisionally, and a phase of at least one of lightwaves of 2N types is different from each other. As illustrated in FIG. 3, the image reproduction device 6 includes a multiple hologram acquisition part 61, a parameter selection part 63, a hologram generation part 64, and a lightwave restoration part 65. The image reproduction device 6 further includes a storage part 62, an amplitude and phase calculation part 68, and an image reproduction part 69. The above-described elements of the image reproduction device 6 are realized by a CPU, a flash memory, or the like, similarly to those of the recording controller 5 of hologram recording device. The image reproduction device 6 is included in the computer 50, similarly to the recording controller 5, and sends and receives a signal to and from the recording controller 5.

The multiple hologram acquisition part 61 acquires not less than N and not more than 2N multiple holograms $I_1$, $I_2$, . . . , each of which is recorded by the image pickup device 2, from the image pickup device control part 52 of the hologram recording device.

The multiple hologram acquisition part 61: writes the acquired multiple holograms $I_1$, $I_2$, . . . into the storage part 62; and sends an acknowledgement that the write has been completed to the parameter selection part 63.

The storage part 62: stores therein the multiple holograms $I_1$, $I_2$, . . . ; and is realized by a generally available storage medium such as a semiconductor memory.

The parameter selection part 63 sequentially selects a parameter. The parameter selection part 63 outputs the selected parameter to the hologram generation part 64.

The parameter selection part 63 sequentially selects a parameter until N parameters are selected; and output the N parameters to the hologram generation part 64.

The hologram generation part 64 generates a hologram which contains two lightwaves each having the parameter selected by the parameter selection part 63 (a computer generated hologram), from the multiple holograms $I_1$, $I_2$, . . . stored in the storage part 62.

The hologram generation part 64 outputs the generated hologram to the lightwave restoration part 65.

The hologram generation part 64 generates as many holograms (computer generated holograms) as parameters selected by the parameter selection part 63.

The lightwave restoration part 65 restores one of two lightwaves from a hologram generated by the hologram generation part 64 (a computer generated hologram).

The lightwave restoration part 65 restores as many lightwaves as parameters selected by the parameter selection part 63.

The lightwave restoration part 65 outputs the restored lightwaves to the amplitude and phase calculation part 68.

The amplitude and phase calculation part 68 calculates an amplitude and a phase at a given depth of each of the lightwaves restored by the lightwave restoration part 65.

The amplitude and phase calculation part 68 outputs the calculated amplitude and phase at the given depth to the image reproduction part 69.

The image reproduction part 69 restores a three-dimensional image from the amplitude and the phase at the given depth calculated by the amplitude and phase calculation part 68.

Specific operations performed by the image reproduction device 6 will be detailed in an image reproduction method to be described hereinafter.

(Hologram Recording Method)

A hologram recording method performed by the hologram recording device of the digital holography device 10 according to this embodiment is described with reference to FIG. 1. As described above, the light $L_{OBJ}$ from the object OBJ: passes through the spatial light phase modulator 1; and enters the image pickup device 2 as two lightwaves for each of the wavelength ranges of R, G, and B. Of the six lightwaves in total, the two lightwaves in the same wavelength range forms an interference pattern on an imaging surface of the image pickup device 2, results in overlapping of the interference patterns with three patterns for R, G, and B. The image pickup device 2: takes a single image of the interference patterns with the three pattern; and records the taken image as a multiple hologram I. The multiple hologram I is represented as the multiple hologram I (x, y) where appropriate (x, y are plane coordinates). The image pickup device 2 further takes a prescribed number of images of the interference patterns to record, for example, three to six multiple holograms $I_1$, $I_2$, . . . . In time with each of the imagings, a phase difference between the two lightwaves is varied by changing amounts of phase shifts α, α' of at least one of the light phase modulation elements 11a, 12a (the cell 1a) and the light phase modulation elements 11b, 12b (the cell 1b) of the spatial light phase modulator 1 (the first and second spatial light phase modulators 11, 12). This makes the multiple holograms $I_1$, $I_2$, . . . different from each other. The number of multiple holograms required for reproducing an image is different for different image reproduction methods to be described hereinafter. In order to simplify calculation of reproducing an image, as described above, the two lightwaves forming each of the interference patterns of the multiple hologram I preferably have an intensity ratio of or close to one.

Herein, the amount of phase shift α' of the cell 1b is made fixed; a lightwave of the cell 1b is set to be a spherical wave not including a return wave; and the amount of phase shift α is varied. Each time the amount of phase shift α is varied, α is stored for each parameter (a wavelength range) and the amount of phase shift α' with respect to at least one wavelength range (an N-th parameter) of light is also stored. Further, with respect to the light of the N-th parameter, as a result of computation using the multiple holograms $I_1$, $I_2$, . . . , control is provided such that a phase difference between an amount of phase shift α, α' and the two lightwaves by the cell 1a or the cell 1b at each time of imaging be a value of a hologram by a lightwave of a single parameter, or a value of the hologram by the lightwave of the single parameter and a zero-order diffraction light intensity distribution, for each of the parameters. Details will be given in the explanation to be described later of the image reproduction method. Let a wavelength range of red be the N-th (third) parameter used herein. Values of respective amounts of phase shift are stored in a storage of the spatial light phase modulator control part 51 (the computer 50).

(Image Reproduction Method)

Figure 4:
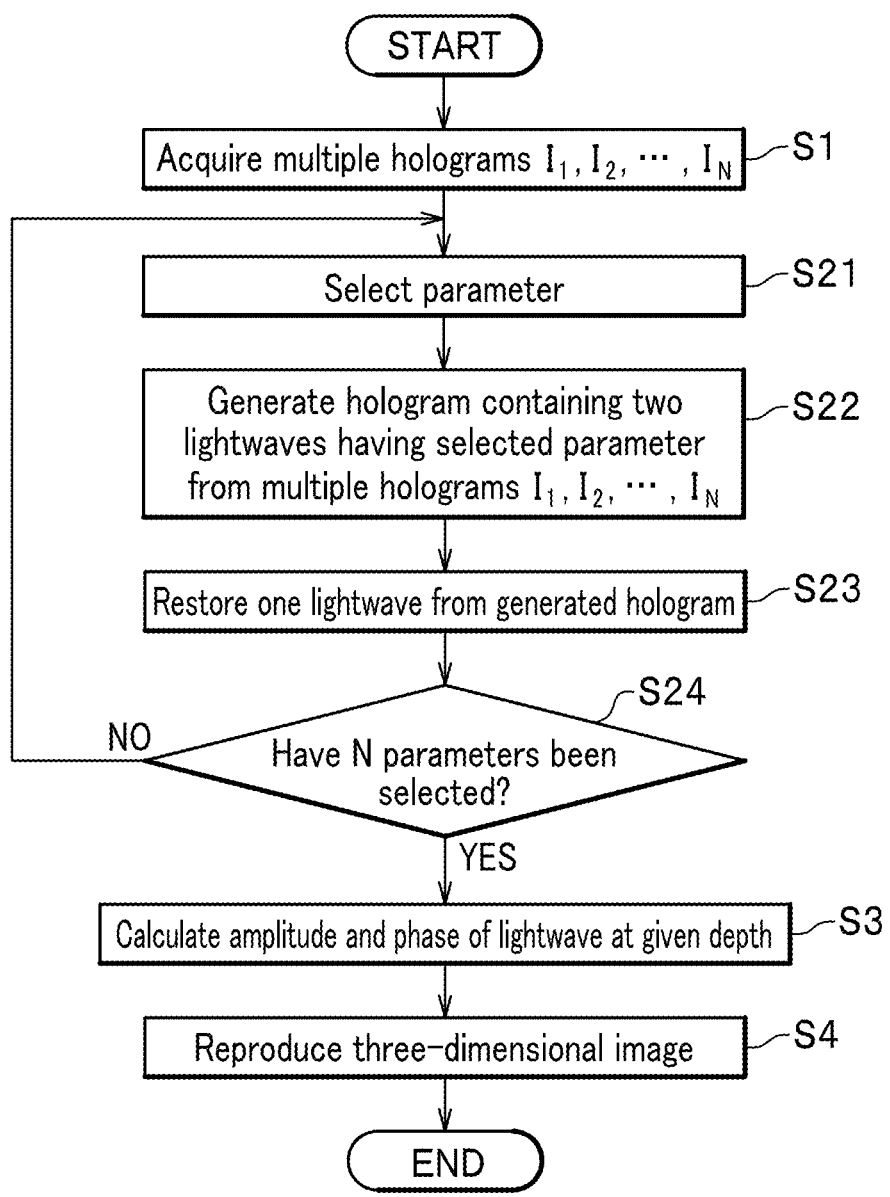
FIG. 4 is a flowchart for explaining an image reproduction method according to the first embodiment of the present invention.

An image reproduction method performed by the image reproduction device 6 of the digital holography device 10 according to an embodiment of the present invention (which is hereinafter referred as an image reproduction method according to a first embodiment of the present invention) is described with reference to FIG. 4. The multiple hologram acquisition part 61 acquires N multiple holograms $I_1$, $I_2$, . . . , $I_N$ recorded by the image pickup device 2, from the image pickup device control part 52 of the hologram recording device (a multiple hologram acquisition step S1). The parameter selection part 63 selects the N-th parameter from the N parameters (a parameter selection step S21). The hologram generation part 64 generates a hologram (a computer generated hologram) containing two lightwaves having the selected N-th parameter, from the multiple holograms $I_1$, $I_2$, . . . , $I_N$ (a hologram generation step S22). The lightwave restoration part 65 restores one of the two lightwaves from the generated hologram (a lightwave restoration step S23). When all parameters have not yet been selected (S24: NO), the processing repeats steps S21 to S23. When the processing performs the second parameter selection step S21, a (N−1) parameter is selected, and, in steps S22, S23, a lightwave having the (N−1) parameter is restored. When all parameters have been selected (S24: YES), that is, when respective lightwaves having all of the parameters have been restored, the amplitude and phase calculation part 68 calculates an amplitude and a phase at a given depth for each of the restored lightwaves (amplitude and phase calculation step S3), and the image reproduction part 69 thereby reproduces a three-dimensional image (an image reproduction step). Each of the steps is described below in detail assuming a case where three wavelength ranges, namely, R, G, and B are used (N=3) when N multiple holograms are used.

Formula (1) as follows expresses a hologram obtained by using a self-interferometer or an interferometer which takes an image of a phase object. In Formula (1), I (x, y) is a given hologram in which an interference pattern of one pattern is recorded. A (x, y) is an amplitude distribution on a recording (imaging) surface of a lightwave, and φ (x, y) is a phase difference distribution of two lightwaves, and M is an intensity ratio (1:M) of the two lightwaves.

[Formula 1]

$$I(x,y)=A(x,y)^2+MA(x,y)^2+2\sqrt{M}A(x,y)^2 \cos[\phi(x,y)] \quad (1)$$

Formula (2) as follows expresses a j-th multiple hologram $I_j(x, y)$ which multiply records interference patterns of N patterns recorded by the hologram recording device which is realized by a self-interferometer according to this embodiment, or by a dual beam interferometer which measures a phase object. In Formula (2): $A_i$, $M_i$ is an amplitude and an intensity ratio of light of an i-th parameter (a wavelength range), respectively; $\varphi_i$ is a phase difference of two lightwaves of the i-th parameter in the first multiple hologram $I_1(x, y)$; and $α_{ij}$ is a relative amount of phase shift between one and the other of the two lightwaves of the i-th parameter in the j-th multiple hologram $I_j(x, y)$.

[Formula 2]

$$I_j(x, y) = \sum_{i=1}^{N} \{A_i(x, y)^2 + M_i A_i(x, y)^2 + 2\sqrt{M_i} A_i(x, y)^2 \cos[\phi_i(x, y) - \alpha_{ij}]\} \quad (2)$$

An algorithm of compressed sensing (see Non-Patent Document 3) teaches that an amplitude distribution on a recording surface of a lightwave and a phase difference distribution of two lightwaves can be extracted from a hologram with an interference pattern of one pattern recorded therein. More specifically, in Formula (1), only A (x, y) and φ (x, y) in the third term on the right-hand side are extracted. This makes it possible to selectively extract a lightwave in each wavelength range from three multiple holograms ($I_1$, $I_2$, $I_3$) in which interference patterns in three wavelength ranges are multiplex-recorded.

To reproduce an image from N multiple holograms, an amount of phase shift $α_{ij}$ of each of the N multiple holograms is set as follows. An amount of phase shift $α_{i1}$ in the first multiple hologram $I_1$ is set to 0 (zero) at each of parameters (wavelength ranges) 0 ($α_{i1}$=0) An amount of phase shift $α_{ij}$ which is an i-th parameter (i=1, 2, . . . , N−1) excluding the n-th parameter is set to $α_{ij}=2(j-1)\pi/2^{i-1}$ in each of the second to (N−1)-th multiple holograms $I_j$ (j=2 to N−1). An amount of phase shift $α_{ij}$ of the N-th multiple hologram $I_N$ is set to an integral multiple of 2π, and, preferably, $α_{ij}=\pm(N-i)2\pi$. An amount of phase shift $α_{Nj}$ of the n-th parameter is set to any given value of each of the second to the (N−1)th multiple hologram $I_j$; and, the N-th multiple hologram $I_N$ any given value other than the integral multiple of 2π. As it is assumed herein that N=3, the following is set: $α_{11}=α_{21}=α_{31}=0$; $α_{12}=2\pi$; $α_{22}=2\pi/2=\pi$; $a_{13}=4\pi$ or −4π; and $α_{23}=2\pi$ or −2π, and $α_{32}$ of any given value; and $α_{33}$ of any given value other than the integral multiple of 2π. The spatial light phase modulator control part 51 sends information on those amounts of phase shift $α_{ij}$ and the phase difference $\varphi_N$ of the N-th parameter to the image reproduction device 6. This allows the red wavelength range to be selected as the N-th (third) parameter to be selected first (a parameter selection step S21), and to extract $A_3(x, y)$ and $\varphi_3(x, y)$ in a manner to be described below. Note that, as described above, the parameters are selected in the order of i=N, N−1, . . . , 2, and 1.

As described above, each of the amounts of phase shift $α_{11}, α_{21}, α_{31}$ of the first multiple holograms $I_1$ is 0 (zero) in each of the wavelength ranges to give a reference amount of phase shift ($α_{i1}$=0). In the second multiple hologram $I_2$ (j=2), i=1 to N−1, that is, the amounts of phase shift $α_{12}, α_{22}$ of the blue and green wavelength ranges are $2\pi$ and $2\pi/2$ for each wavelength, respectively; and, I=N, that is, the amount of phase shift $\alpha_{32}$ of the red wavelength range is any given value. In the third multiple hologram $I_3$, the respective amounts of phase shift $\alpha_{13}$, $\alpha_{23}$ of the blue and green wavelength ranges in light are multiple integrals of $2\pi$; and the amount of phase shift $\alpha_{33}$ of the red wavelength range of light is a value other than the multiple integral of $2\pi$. Those multiple holograms $I_1$, $I_2$, $I_3$ are represented by Formulae (3) to (5), respectively. In each of the formulae, $I_{0th}(x, y)$ is a sum of zero-order diffraction light intensity distributions for each of the parameters.

[Formula 3]

$$I_1(x, y) = I_{0th}(x, y) + \sum_{i=1}^{3} 2\sqrt{M_i} A_i(x, y)^2 \cos\{\phi_i(x, y)\} \quad (3)$$

$$I_2(x, y) = I_{0th}(x, y) + \sum_{i=1}^{3} 2\sqrt{M_i} A_i(x, y)^2 \cos\{\phi_i(x, y) + \alpha_i(x, y)\} \quad (4)$$

$$I_3(x, y) = I_{0th}(x, y) + \sum_{i=1}^{3} 2\sqrt{M_i} A_i(x, y)^2 \cos\{\phi_i(x, y) + 2\alpha_i(x, y)\} \quad (5)$$

To simplify computation, such approximation is performed that $M_1 \approx M_2 \approx M_3 \approx M$. By setting $\alpha_{32}=\pi/2$ and $\alpha_{33}$ to an odd multiple of $\pi$, Formula (6) as follows can be obtained from Formula (3) and Formula (5). Formula (6) shows that a hologram only having an interference pattern of the red lightwave as the third parameter (a hologram generation step S22).

[Formula 4]

$$I_1(x,y) - I_3(x,y) = 4\sqrt{M}A_3(x,y)^2 \cos \phi_3(x,y) \quad (6)$$

The extracted hologram represented by Formula (6) allows $A_3(x, y)$ and $\phi_3(x, y)$ to extracted using, as described above, the algorithm of compressed sensing (see Non-Patent Document 3) (a lightwave restoration step S23).

As a parameter to be selected second (i=N−1=2), for example, a green wavelength range is selected (a parameter selection step S21), from which $A_2(x, y)$ and $\phi_2(x, y)$ are extracted. Herein, a member containing $A_3(x, y)$, $\cos \phi_3(x, y)$, and $\sin \phi_3(x, y)$ ($=\cos[\phi_3(x, y)-\pi/2]$) is excluded from each of the two multiple holograms $I_1$, $I_2$, other than the multiple hologram $I_3$ and the subtraction same as that of the first. As represented by the following Formula (7), a hologram only having an interference pattern of a green lightwave as the second parameter is extracted (a hologram generation step S22). $A_2(x, y)$ and $\phi_2(x, y)$ are similarly extracted from the extracted hologram (a lightwave restoration step S23).

[Formula 5]

$$I_1(x,y) - I_2(x,y) = 4\sqrt{M}A_2(x,y)^2 \cos \phi_2(x,y) \quad (7)$$

Lastly (as the third), a blue wavelength range is selected; and a member containing $A_3(x, y)$, $\cos \phi_3(x, y)$, $\sin \phi_3(x, y)$ ($=\cos[\phi_3(x, y)-\pi/2]$), $A_2(x, y)$, $\cos \phi_2(x, y)$, and $\sin \phi_2(x, y)$ ($=\cos[\phi_2(x, y)-\pi/2]$) is excluded from the multiple hologram $I_1$, to thereby a hologram only having an interference pattern of a blue lightwave (a hologram generation step S22). Then, $A_1(x, y)$ and $\phi_1(x, y)$ are extracted from the extracted hologram (a lightwave restoration step S23).

An amplitude distribution and a phase distribution at a given depth are calculated for each of the wavelength ranges from a lightwave on an imaging surface of the image pickup device 2 (an amplitude and phase calculation step S3). The calculation can be performed by applying thereto a computation algorithm of a known diffraction integral, an image reproduction algorithm using compressed sensing, an image reproduction algorithm using machine learning such as deep learning. A two-dimensional image or a three-dimensional image at the above-described depth can be reproduced from the amplitude distribution and the phase distribution of the lightwave of each of the wavelength ranges obtained for the each depth (an image reproduction step S4).

Note that when N=2, given $\alpha_{i1}=0$ and $\alpha_{12}=\pi$, the two multiple holograms $I_1$, $I_2$ are expressed by Formula (3) and Formula (4), respectively, meaning that, as in the case of N=3, a lightwave can also be restored. In the lightwave restoration step S23, in addition to using the compressed sensing algorithm, an unwanted light removal algorithm using estimation based on a known machine learning or repeated computation.

The image reproduction method according to this embodiment makes it possible to reproduce an image from N multiple holograms as many as N parameters. Meanwhile, in recording a multiple hologram, it is required that a lightwave of each parameter be set to an amount of phase shift having a prescribed value with respect to a wavelength of interest. Thus, when the number of parameters N is large, it becomes difficult to generate a lightwave in some cases depending on a type of information on, for example, a wavelength range. In light of this, by obtaining a multiple hologram up to 2N in number, an amount of phase shift can be set to any value, except for a lightwave of part of parameters. A variation of the image reproduction method performed by the image reproduction device according to the embodiment of the present invention is an image reproduction method according to a variation of the first embodiment of the present invention) is described next.

(Variation: Image Reproduction Method)

In the present variation, an amount of phase shift in a wavelength range of each of the second to 2N-th multiple holograms $I_2$, $I_3$, $I_{2N}$ can be set to any given value, though the amount of the first multiple hologram $I_1$ is set to 0 ($\alpha_{i1}=0$). When N=3, six multiple holograms $I_1$, $I_2$, $I_3$, $I_4$, $I_5$, $I_6$ are expressed in Formula (8) to Formula (13) as follows, respectively. Respective coefficients of $\alpha_i(x, y)$ in the second member on the right-hand side of the formulae are −3, −2, −1, +1, +2, and +3, respectively.

[Formula 6]

$$I_1(x, y) = I_{0th}(x, y) + \sum_{i=1}^{3} 2\sqrt{M} A_i(x, y)^2 \cos\{\phi_i(x, y) - 3\alpha_i(x, y)\} \quad (8)$$

$$I_2(x, y) = I_{0th}(x, y) + \sum_{i=1}^{3} 2\sqrt{M} A_i(x, y)^2 \cos\{\phi_i(x, y) - 2\alpha_i(x, y)\} \quad (9)$$

$$I_3(x, y) = I_{0th}(x, y) + \sum_{i=1}^{3} 2\sqrt{M} A_i(x, y)^2 \cos\{\phi_i(x, y) - \alpha_i(x, y)\} \quad (10)$$

$$I_4(x, y) = I_{0th}(x, y) + \sum_{i=1}^{3} 2\sqrt{M} A_i(x, y)^2 \cos\{\phi_i(x, y) + \alpha_i(x, y)\} \quad (11)$$

$$I_5(x, y) = I_{0th}(x, y) + \sum_{i=1}^{3} 2\sqrt{M} A_i(x, y)^2 \cos\{\phi_i(x, y) + 2\alpha_i(x, y)\} \quad (12)$$

-continued $$I_6(x, y) = I_{0th}(x, y) + \sum_{i=1}^{3} 2\sqrt{M_i} A_i(x, y)^2 \cos\{\phi_i(x, y) + 3\alpha_i(x, y)\} \quad (13)$$

Formula (14) as follows is obtained from Formula (8) and Formula (13). Formula (15) as follows is obtained from Formula (9) and Formula (12). Formula (16) as follows is obtained from Formula (10) and Formula (11). Since $A_3(x, y)^2 \sin \varphi_3(x, y)$ can be extracted from the three simultaneous equations Formula (14), Formula (15), and Formula (16) (a hologram generation step S22), a red lightwave can be restored, similarly to the above-described embodiment (a lightwave restoration step S23). A subtraction similar to that of the first is then performed, which makes it possible to extract $A_2(x, y)^2 \sin \varphi_2(x, y)$ (a hologram generation step S22) and restore a green lightwave (a lightwave restoration step S23). Further, a blue lightwave can also be restored, similarly to the above-described embodiment.

[Formula 7]

$$I_1(x, y) - I_6(x, y) = \sum_{i=1}^{3} 4\sqrt{M_i} A_i(x, y)^2 \sin\phi_i(x, y)\sin 3\alpha_i(x, y) \quad (14)$$

$$I_2(x, y) - I_5(x, y) = \sum_{i=1}^{3} 4\sqrt{M_i} A_i(x, y)^2 \sin\phi_i(x, y)\sin 2\alpha_i(x, y) \quad (15)$$

$$I_3(x, y) - I_4(x, y) = \sum_{i=1}^{3} 4\sqrt{M_i} A_i(x, y)^2 \sin\phi_i(x, y)\sin\alpha_i(x, y) \quad (16)$$

The image reproduction method according to the present variation, with respect to 2N multiple holograms, the number of which is twice as many as N parameters, a lightwave forming an interference pattern of the each multiple hologram is generated using a given amount of phase shift, to thereby reproduce an image. Note that the number of multiple hologram can be reduced to or below (2N–1), when an amount of phase shift of a lightwave of part of one or more parameters is set to a value corresponding to a wavelength of the lightwave, similarly to the above-described embodiment.

The image reproduction method according to the first embodiment or a variation thereof enables an image containing light having N parameters to be reproduced from as few as N multiple holograms. The image reproduction method according to the first embodiment or the variation thereof can be applied to a multiple hologram which is recorded using a given interferometer such as a dual beam interferometer. The image reproduction method, however, requires more calculation time in proportion to the number of N parameters, because a lightwave of each parameter is restored using the compressed sensing algorithm. Thus, by obtaining 2N multiple holograms, an image can be reproduced rapidly. Next is described an image reproduction device and an image reproduction method performed by the image reproduction device according to a second embodiment of the present invention.

Second Embodiment (Image Reproduction Device)

Figure 5:
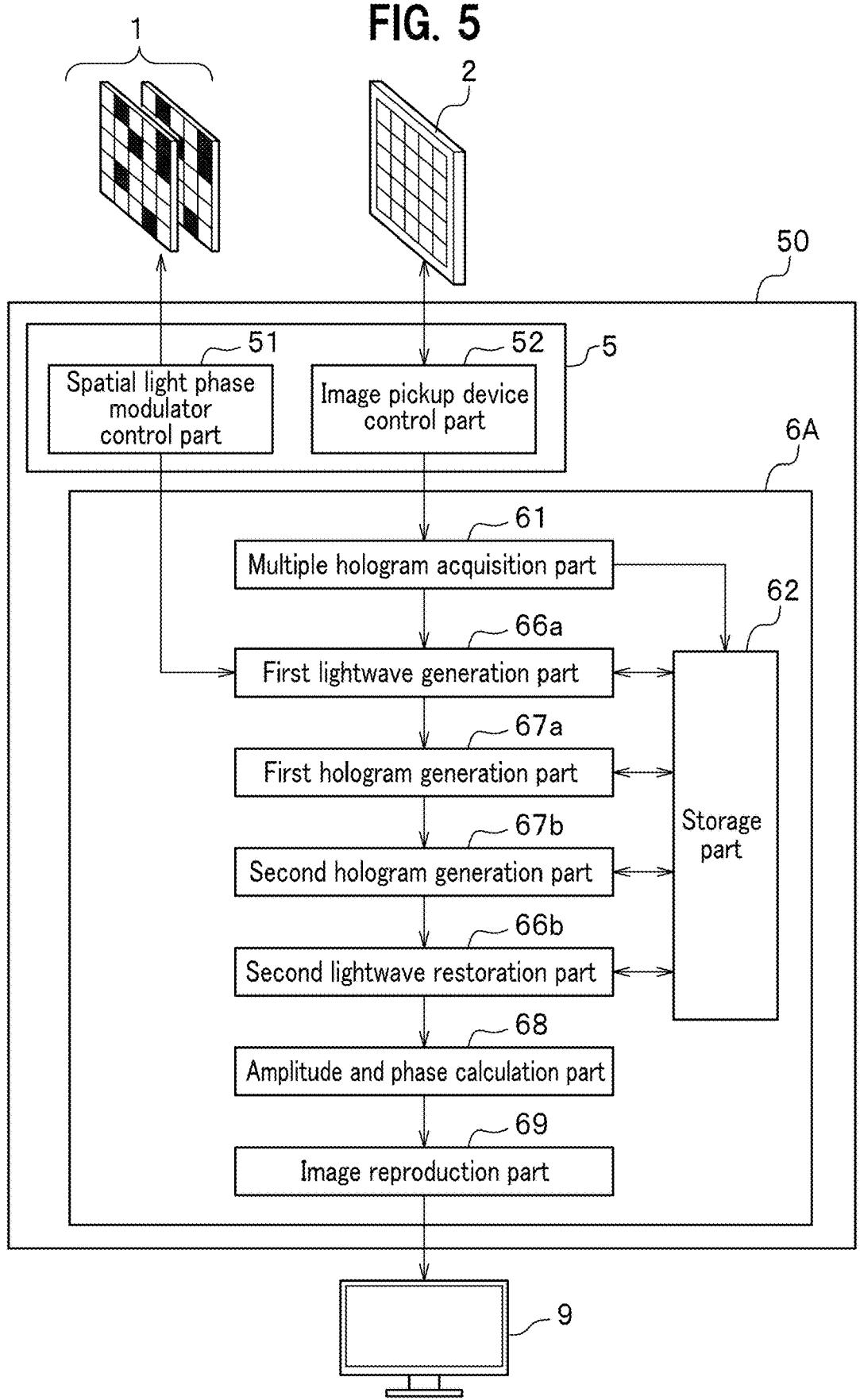
FIG. 5 is a block diagram of a computation part of a digital holography device for explaining a structure of an image reproduction device according to a second embodiment of the present invention.

An image reproduction device 6A according to the second embodiment of the present invention reproduces from 2N multiple holograms, an image which contains N parameters for each of one or more pieces of optical information selected from a wavelength range, a polarization direction, and a measurement region, or N combinations thereof. In the 2N multiple holograms, N patterns of interference patterns each formed by two lightwaves of which phases are different for each parameter are multiplex-recorded time- or space-divisionally. The image reproduction device 6A includes, as illustrated in FIG. 5, a multiple hologram acquisition part 61, a first lightwave restoration part 66a, a first hologram generation part 67a, a second hologram generation part 67b, and a second lightwave restoration part 66b. The image reproduction device 6A further includes a storage part 62, an amplitude and phase calculation part 68, and an image reproduction part 69. Those elements are, similarly to the image reproduction device 6 according to the first embodiment, embodied by a CPU included in the computer 50, a flash memory, or the like.

The first lightwave restoration part 66a generates (N–1) lightwaves each having the first to (N–1)-th parameter from multiple holograms $I_1, I_2, \ldots, I_{2N-1}$ stored in the storage part 62.

The first lightwave restoration part 66a outputs the restored lightwave to the first hologram generation part 67a, the second hologram generation part 67b, and the amplitude and phase calculation part 68.

The first hologram generation part 67a generates a hologram containing two lightwaves having the N-th parameter (a first computer generated hologram), from at least one of multiple holograms $I_1, I_2, \ldots, I_{2N-1}$ stored in the storage part 62, using the lightwave stored by the first hologram generation part 67a.

The first hologram generation part 67a outputs the generated hologram to the second lightwave restoration part 66b.

The second hologram generation part 67b generate a hologram containing two lightwaves having the N-th parameter (a second computer generated hologram), from the multiple hologram $I_{2N}$ stored in the storage part 62, using the lightwave restored by the first hologram generation part 67a.

The second hologram generation part 67b outputs the generated hologram to the second lightwave restoration part 66b.

The second lightwave restoration part 66b restores a lightwave of one of the two lightwaves from the holograms generated by the first hologram generation part 67a and the second hologram generation part 67b.

The second lightwave restoration part 66b outputs the restored lightwave to the amplitude and phase calculation part 68.

Specific operations performed by the image reproduction device 6A will be detailed when the image reproduction method is described hereinafter.

The hologram recording device of the digital holography device 10 including the above-described image reproduction device 6A records 2N multiple holograms $I_1, I_2, \ldots, I_{2N}$. With respect to a lightwave of the N-th parameter (for example, a lightwave in a blue wavelength range), an amount of phase shift is set as follows. Of the 2N multiple holograms $I_1, I_2, \ldots, I_{2N}$, an amount of phase shift $\alpha_{Nj}$ of each of (2N–1) multiple holograms $I_1, I_2, \ldots, I_{2N-1}$ is set to an integral multiple of $2\pi$ (an even multiple of $\pi$), except that one of the (2N–1) multiple holograms $I_1, I_2, \ldots, I_{2N-1}$, namely, a multiple hologram $I_k$, is set such that $\alpha_{Nk}=0$. And, the amount of phase shift $\alpha_{N2N}$ of the multiple hologram $I_{2N}$ is set to a value other than the integral multiple of $\pi$. Meanwhile, with respect to a lightwave of the first to the (N–1)-th parameter, the amount of phase shift is set as follows. The amount of phase shift of the multiple hologram $I_k$ having been set such that $\alpha_{Nk}=0$ is set such that $\alpha_{ik}=0$, so as to provide a reference amount of phase shift. The amount of phase shift of each of the multiple holograms other than the multiple hologram $I_k$ is set to any given amount of phase shift $\alpha_{ij}$.

(Image Reproduction Method)

Figure 6:
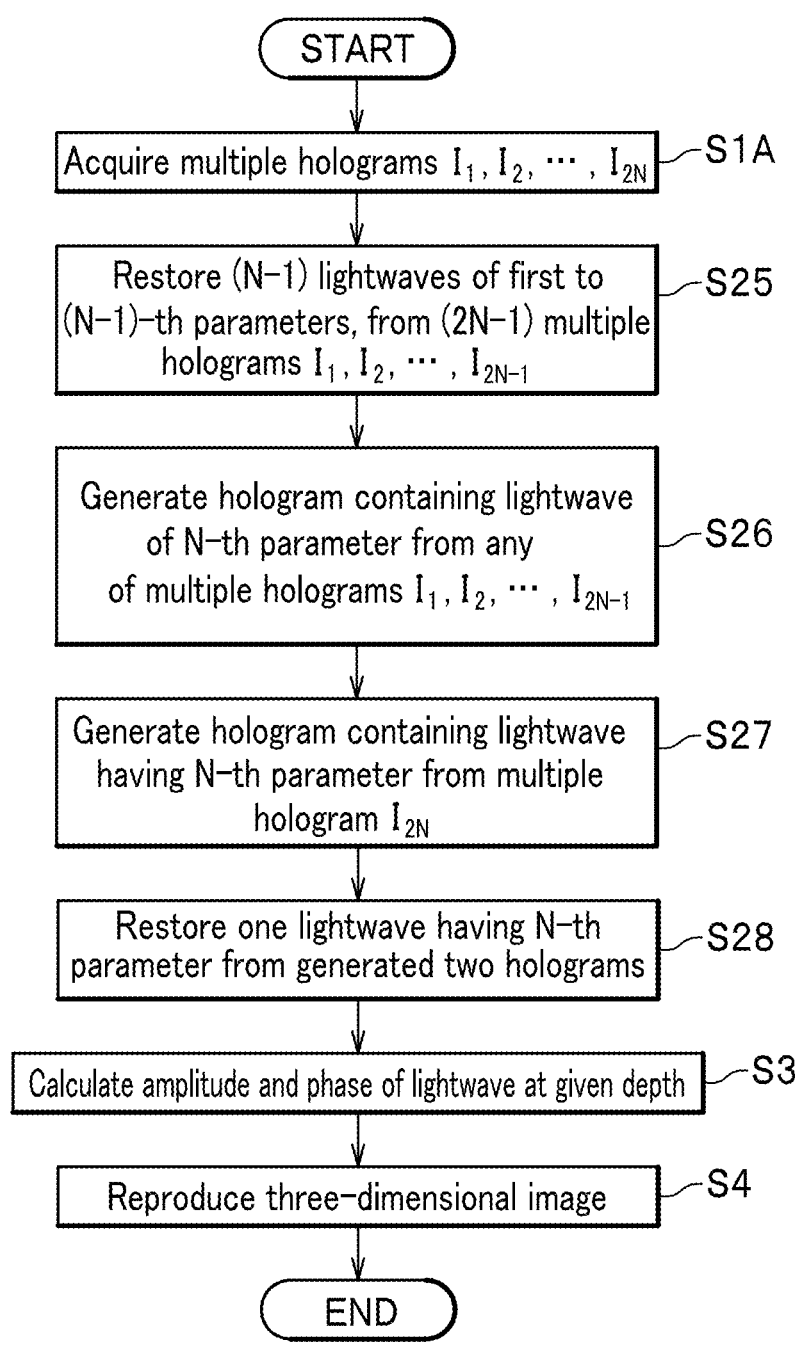
FIG. 6 is a flowchart for explaining an image reproduction method according to the second embodiment of the present invention.

The image reproduction method performed by the image reproduction device 6A of the digital holography device 10 according to this embodiment (which may also be hereinafter referred to as the image reproduction method according to the second embodiment of the present invention) is described with reference to FIG. 6. The multiple hologram acquisition part 61 acquires recorded by the image pickup device 2, from the image pickup device control part 52 of the hologram recording device the 2N multiple holograms $I_1$, $I_2, \ldots, I_{2N}$ (a multiple hologram acquisition step S1A). The first lightwave restoration part 66a restores (N−1) respective lightwaves having the first to the (N−1)-th parameters, from the (2N−1) multiple holograms $I_1, I_2, \ldots, I_{2N-1}$ (a first lightwave restoration step S25). The first hologram generation part 67a generates a hologram formed by two lightwaves having the N-th parameter (a first computer generated hologram) from the multiple holograms $I_1, I_2, \ldots, I_{2N-1}$, using the restored (N−1) lightwaves (a first hologram generation step S26); and the second hologram generation part 67b generates a hologram formed by two lightwaves having the N-th parameter (a second computer generated hologram) from the multiple hologram $I_{2N}$ (a second hologram generation step S27). The second lightwave restoration part 66b restores one lightwave having the N-th parameter from the generated two holograms (a second lightwave restoration step S28). Then, similarly to the first embodiment, the amplitude and phase calculation part 68 calculates an amplitude a phase at a given depth for each of the lightwaves (the amplitude and phase calculation step S3); and the image reproduction part 69 thereby reproduces a three-dimensional image (the image reproduction step). The above-described steps will be described in detail hereinafter.

As described above, with respect to the blue wavelength range, the amounts of phase shift $\alpha_{31}(=-4\pi)$, $\alpha_{32}(=-2\pi)$, $\alpha_{33}(=0)$, $\alpha_{34}(=2\pi)$, $\alpha_{36}(=4\pi)$, and $\alpha_{36}$ are set to the multiple holograms $I_1, I_2, \ldots,$ and $I_6$, respectively. The spatial light phase modulator control part 51 gives the information to the image reproduction device 6A. Also, with respect to each of lightwaves of a red wavelength range and a green wavelength range, amounts of phase shift $\alpha_{i1}$, $\alpha_{i2}$, $\alpha_{i3}(=0)$, $\alpha_{i4}$, $\alpha_{i5}$, and $\alpha_{i6}$ are set to the multiple holograms $I_1, I_2, \ldots,$ and $I_6$, and the information is similarly given to the image reproduction device 6A. This makes it possible to restore a lightwave other than the blue wavelength range as the N-th parameter, that is, the respective lightwaves of the green wavelength range and the red wavelength range, from the multiple holograms $I_1, I_2, \ldots, I_5$, using a known method (the first lightwave restoration step S25). A specific example for explanation is given below.

Let $I'_3(x, y)$ be a hologram having only an interference pattern of the blue lightwave. The multiple holograms $I_1$, $I_2, \ldots,$ and $I_5$ are expressed respectively, by Formulae (17) to (21) as follows.

[Equation 8]

$$I_1(x, y) = \tag{17}$$
$$I_{0th}(x, y) + I'_3(x, y) + \sum_{i=1}^{2} 2\sqrt{M_i} A_i(x, y)^2 \cos\{\phi_i(x, y) - 2\alpha_i(x, y)\}$$

$$I_2(x, y) = \tag{18}$$
$$I_{0th}(x, y) + I'_3(x, y) + \sum_{i=1}^{2} 2\sqrt{M_i} A_i(x, y)^2 \cos\{\phi_i(x, y) - \alpha_i(x, y)\}$$

$$I_3(x, y) = I_{0th}(x, y) + I'_3(x, y) + \sum_{i=1}^{2} 2\sqrt{M_i} A_i(x, y)^2 \cos\{\phi_i(x, y)\} \tag{19}$$

$$I_4(x, y) = \tag{20}$$
$$I_{0th}(x, y) + I'_3(x, y) + \sum_{i=1}^{2} 2\sqrt{M_i} A_i(x, y)^2 \cos\{\phi_i(x, y) + \alpha_i(x, y)\}$$

$$I_5(x, y) = \tag{21}$$
$$I_{0th}(x, y) + I'_3(x, y) + \sum_{i=1}^{2} 2\sqrt{M_i} A_i(x, y)^2 \cos\{\phi_i(x, y) + 2\alpha_i(x, y)\}$$

Formulae (22) to (25) as follows can be obtained from Formulae (17) to (21).

[Formula 9]

$$I_3(x, y) - \{I_1(x, y) + I_5(x, y)\} = \tag{22}$$
$$\sum_{i=1}^{2} 4\sqrt{M_i} A_i(x, y)^2 \cos\phi_i(x, y)\cos 2\alpha_i(x, y)$$

$$I_3(x, y) - \{I_2(x, y) + I_4(x, y)\} = \tag{23}$$
$$\sum_{i=1}^{2} 4\sqrt{M_i} A_i(x, y)^2 \cos\phi_i(x, y)\cos\alpha_i(x, y)$$

$$I_1(x, y) - I_5(x, y) = \sum_{i=1}^{2} 4\sqrt{M_i} A_i(x, y)^2 \sin\phi_i(x, y)\sin 2\alpha_i(x, y) \tag{24}$$

$$I_2(x, y) - I_4(x, y) = \sum_{i=1}^{2} 4\sqrt{M_i} A_i(x, y)^2 \sin\phi_i(x, y)\sin\alpha_i(x, y) \tag{25}$$

A (N−1)-th parameter, that is, a real part of the green lightwave, $A_2(x, y) \cos \varphi_2(x, y)$, is calculated from the two simultaneous equations of Formula (22) and Formula (23) (=N−1). An imaginary part of the green lightwave, $A_2(x, y) \sin \varphi_2(x, y)$, is calculated from the two simultaneous equation of Formula (24) and Formula (25). $A_2(x, y)$ and $\cos \varphi_2(x, y)$ of the green lightwave is obtained from the calculated real part $A_2(x, y) \cos \varphi_2(x, y)$ and imaginary part $A_2(x, y) \sin \varphi_2(x, y)$. Similarly, a real part $A_1(x, y) \cos \varphi_1(x, y)$ and an imaginary part $A_1(x, y) \sin \varphi_1(x, y)$ of a red lightwave as the first parameter is calculated, to thereby obtain $A_1(x, y)$ and $\cos \varphi_1(x, y)$ of the red lightwave.

A member including $A_i(x, y)$ and $\cos \varphi_i(x, y)$ of respective lightwaves of the restored red and green wavelength ranges is removed from any one of multiple holograms $I_j(x, y)$ (j=1, 2, ..., 2N−1) expressed by Formula (2) as follows, to thereby generate a hologram $I'_1(x, y)$ having only an interference pattern of blue lightwaves expressed by Formula (26) as follows (a first hologram generation step S26).

Similarly, a hologram I′$_2$(x, y) having only an interference pattern of blue lightwaves expressed by Formula (27) is generated from the multiple hologram I$_6$ using respective lightwaves of the restored red and green wavelength ranges (a second hologram generation step S27). Note that either the first hologram generation step S26 or the second hologram generation step S27 may be performed first before the other and the two steps may be performed in parallel.

[Formula 10]

$$I_j(x, y) = \sum_{i=1}^{N}\{A_i(x, y)^2 + M_i A_i(x, y)^2 + 2\sqrt{M_i} A_i(x, y)^2 \cos[\phi_i(x, y) - \alpha_{ij}]\} \quad (2)$$

$$I'_1(x, y) = A_3(x, y)^2 + M_3 A_3(x, y)^2 + 2\sqrt{M_3} A_3(x, y)^2 \cos\phi_3(x, y) \quad (26)$$

$$I'_2(x, y) = A_3(x, y)^2 + M_3 A_3(x, y)^2 + 2\sqrt{M_3} A_3(x, y)^2 \cos[\phi_3(x, y) - \alpha_{36}] \quad (27)$$

A two-dimensional equation of $A_3(x, y)^2$ can be obtained from Formula (26) and Formula (27), and a trigonometric identity, $(\cos \varphi)^2 + (\sin \varphi)^2 = 1$. Formula (26) and Formula (27) are herein simplified by setting $\alpha_{N2N}(=\alpha_{36})=\pi/2$, to thereby obtain Formula (28) and Formula (29) as follows. Formula (28) and Formula (29) are substituted into the trigonometric identity, to thereby obtain Formula (30) as follows, which is organized to obtain Formula (31) as follows.

[Formula 11]

$$I'_1(x,y)-(1+M_3)A_3(x,y)^2 = 2\sqrt{M_3}A_3(x,y)^2 \cos \phi_3(x,y) \quad (28)$$

$$I'_2(x,y)-(1+M_3)A_3(x,y)^2 = 2\sqrt{M_3}A_3(x,y)^2 \sin \phi_3(x,y) \quad (29)$$

$$\{I'_1(x,y)-(1+M_3)A_3(x,y)^2\}^2 + \{I'_2(x,y)-(1+M_3)A_3(x,y)^2\}^2 = 4M_3 A_3(x,y)^2 \quad (30)$$

$$2(1+M_3^2)A_3(x,y)^4 - 2(1+M_3)\{I'_1(x,y)+I'_2(x,y)\}A_3(x,y)^2 + I'_1(x,y)+I'_2(x,y)0 \quad (31)$$

As expressed by Formula (31), a two-dimensional equation of $A_3(x, y)^2$ ⓐ is written in order to solve a zero-order diffraction light intensity distribution. Formulae (32) to (35) as follows are obtained using the quadratic formula.

[Formula 12]

$$A_3(x, y)^2 = \frac{g \pm \sqrt{g^2 - 4fh}}{2f} \quad (32)$$

$$f = 2(1 + M_3^2) \quad (33)$$

$$g = 2(1 + M_3)\{I'_1(x, y) + I'_2(x, y)\} \quad (34)$$

$$h = I'_1(x, y)^2 + I'_2(x, y)^2 \quad (35)$$

Since Formula (32) has two solutions, it is necessary to determine which is appropriate. Let us assume a case where M=1 so as to simplify the formula. When M=1 is substituted into Formula (32), Formula (36) as follows can be obtained. Two $A_3(x, y)^2$ in Formula (36) is substituted into Formula (28) and Formula (29), to thereby obtain Formula (37) and Formula (38) as follows. Theoretically, Formula (39) as follows is to be obtained from the trigonometric identity. Not both of the two $A_3(x, y)^2$ obtained in Formula (36), however, satisfy Formula (39). More specifically, let us assume a case where M$_3$=1. When $0 \leq \varphi_3(x, y) < 2\pi$ and a value of $\varphi_3(x, y)$ is $0 \leq \varphi_3(x, y) \leq \pi$ or $3\pi/2 \leq \varphi_3(x, y) < 2\pi$, if a plus-minus sign (±) is negative (−) on the right-hand side of Formula (32), then Formula (39) is satisfied. When $\pi < \varphi_3(x, y) < 3\pi/2$, if the plus-minus sign (±) is positive (+) on the right-hand side of Formula (32), then Formula (39) is satisfied. Since $\varphi_3(x, y)$ is an unknown parameter, a discriminant is required. As one of techniques for discriminant, Formula (39) is used herein as a verification formula so as to discriminate which $A_3(x, y)^2$ is to be adopted. By taking one of the two $A_3(x, y)^2$ which makes the left-hand side of Formula (39) closer to 1, a zero-order diffraction light intensity distribution can be calculated. The calculated zero-order diffraction light intensity distribution is subtracted from I′$_1$(x, y), I′$_2$(x, y), which makes it possible to obtain information on $A_N(x, y)$ and $\varphi_N(x, y)$ of a lightwave of the N-th parameter. As described above, $A_3(x, y)$ and $\varphi_3(x, y)$ of a lightwave of the blue wavelength range can be extracted (a second lightwave restoration step S28).

[Formula 13]

$$A_3(x, y)^2 = \frac{I'_1(x, y) + I'_2(x, y) \pm \sqrt{\{I'_1(x, y) + I'_2(x, y)\}^2 - I'_1(x, y)^2 + I'_2(x, y)^2}}{2} = \frac{1}{2}\{I'_1(x, y) + I'_2(x, y) \pm \sqrt{2I'_1(x, y)I'_2(x, y)}\} \quad (36)$$

$$\frac{I'_1(x, y) - 2A_3(x, y)^2}{2A_3(x, y)^2} = \cos\phi_3(x, y) \quad (37)$$

$$\frac{I'_2(x, y) - 2A_3(x, y)^2}{2A_3(x, y)^2} = \sin\phi_3(x, y) \quad (38)$$

$$\left\{\frac{I'_1(x, y) - 2A_3(x, y)^2}{2A_3(x, y)^2}\right\}^2 + \left\{\frac{I'_2(x, y) - 2A_3(x, y)^2}{2A_3(x, y)^2}\right\}^2 = 1 \quad (39)$$

By performing the aforementioned steps, respective lightwaves of all wavelength ranges can be restored. Then, similarly to the first embodiment, the amplitude and phase calculation step S3 and the image reproduction step S4 are performed.

The image reproduction method according to this embodiment makes it possible to, similarly to the variation of the first embodiment, reproduce an image containing light having N parameters from 2N multiple holograms and also to set a lightwave of each parameter in recording a multiple hologram, to any amount of phase shift. Further, since repeated computation as used in the compressed sensing algorithm is not necessary, computation time can be reduced and an image can be reproduced rapidly. The image reproduction method is applicable to a condition in which the intensity ratio is 1 (1:1) or close to that value, thus allowing a clear interference pattern to be recorded. Additionally, $A_N(x, y)^2$ is calculated for each pixel without approximation, the calculation can be performed even when $A_N(x, y)^2$ is spatially distributed.

A plurality of multiple hologram used in the image reproduction method performed by each of the image reproduction devices 6, 6A according to the embodiment can be space-divided and then recorded. For example, when an image containing light having three wavelength ranges is reproduced, six multiple holograms are required and the spatial light phase modulator 1 simultaneously provides six phase modulation patterns. The spatial light phase modulator 1 therefore has six pairs of the cells 1a, 1b, which have different amounts of phase shift α, α' for the different multiple holograms. In other words, the spatial light phase modulator 1 includes 12 mosaic-like arranged cells having respective amounts of phase shift different from each other. Lightwaves generated by the spatial light phase modulator 1 as described above form six different interference patterns. The image pickup device 2 records the interference patterns as one multiple hologram at one multiplex recording. Each of the image reproduction devices 6, 6A extracts one pixel of each of the six-pixel pairs of the image pickup device 2, from the recorded multiple hologram, to thereby obtain six multiple holograms.

(Variation: Digital Holography Device)

The spatial light phase modulator 1 of the hologram recording device the digital holography device 10 that conducts the image reproduction method by the image reproduction devices 6, 6A according to the embodiment can be realized by a reflective liquid-crystal spatial light modulator. Next is described a digital holography device according to a variation of the embodiment of the present invention, with reference to FIG. 7.

The digital holography device 10A according to a first variation of the embodiment of the present invention includes: in place of the spatial light phase modulator 1, a spatial light phase modulator 1A (a lightwave generator) including the first spatial light phase modulator 11A and the second spatial light phase modulator 12A; and a 4f optical system 41 disposed between the first spatial light phase modulator 11A and the second spatial light phase modulator 12A. Except for the described above, the configuration of the digital holography device 10A is the same as that of the digital holography device 10 according to the aforementioned embodiment.

The first spatial light phase modulator 11A and the second spatial light phase modulator 12A is a reflective liquid-crystal spatial light modulator such as a LCOS (Liquid Crystal On Silicon)-SLM. In the digital holography device 10A: the first spatial light phase modulator 11A is disposed such that the light $L_{OBJ}$ entered from the object OBJ is reflected therein as the light $L_0$, $L_{90}$ which passes through the 4f optical system 41 to enter the second spatial light phase modulator 12A; and the second spatial light phase modulator 12A is disposed such that the light $L_0$, $L_{90}$ entered from the first spatial light phase modulator 11A is reflected therein and then enters the image pickup device 2. The first spatial light phase modulator 11A and the second spatial light phase modulator 12A have configurations same as those of the first spatial light phase modulator 11 and the second spatial light phase modulator 12, respectively, of the digital holography device 10 according to the aforementioned embodiment, except that the former are of reflective type and the latter are of transmissive type. This means that the first spatial light phase modulator 11A includes the same number of the light phase modulation elements 11a, 11b with the same pitch. The second spatial light phase modulator 12A includes the same number of the light phase modulation elements 12a, 12b with the same pitch. A polarization direction of light phase-modulated in the light phase modulation elements 11a, 11b is mutually perpendicular to a polarization direction of light phase-modulated in the light phase modulation elements 12a, 12b (see FIG. 2). Further, the light phase modulation element 11a and the light phase modulation element 12a, as well as the light phase modulation element 11b and the light phase modulation element 12b: have the amount of phase shift; and are disposed in the same location when viewed in an optical axis direction. Note that light entering a given point on an incident surface of the 4f optical system 41 exits from a point 180-degree rotated with respect to the optical axis of the 4f optical system 41 as the origin, on an outgoing surface. Taking this on account, the light phase modulation elements 11a, 11b of the first spatial light phase modulator 11A and the light phase modulation elements 12a, 12b of the second spatial light phase modulator 12A are disposed in accordance with each other.

Figure 7:
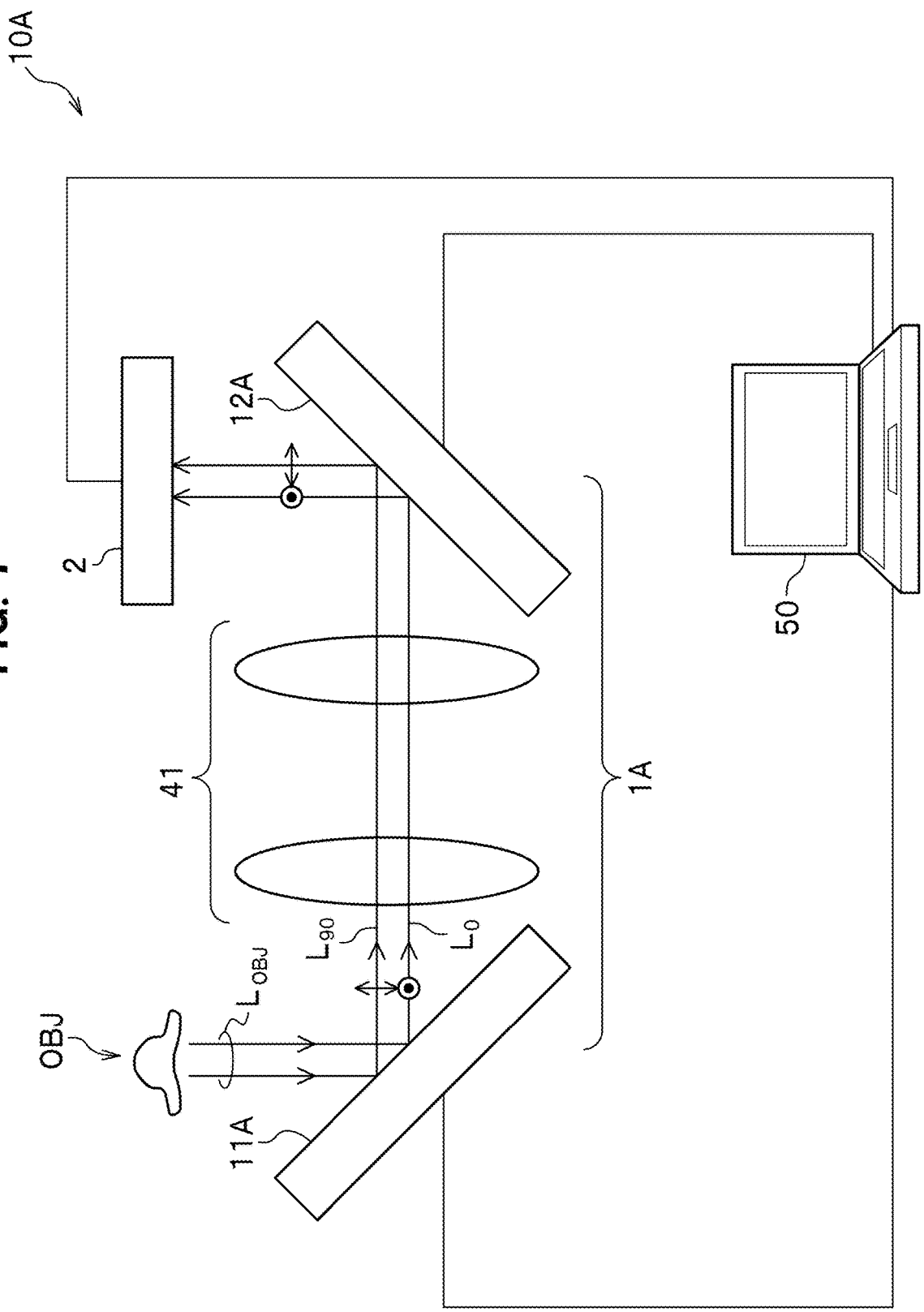
FIG. 7 is a schematic diagram for explaining a structure of a digital holography device according to a first variation of the embodiment of the present invention.

Herein, the light phase modulation elements 11a, 11b of the first spatial light phase modulator 11A phase-modulates the light $L_0$ in a polarization direction in a perpendicular direction with respect to the plane of FIG. 7; and the light phase modulation elements 12a, 12b the second spatial light phase modulator 12A phase-modulates the light $L_{90}$ in a polarization direction which is perpendicular to the direction of the light $L_0$. That is, when the light $L_{OBJ}$ from the object OBJ enters the first spatial light phase modulator 11A and is reflected thereon, the light $L_{90}$ is not modulated, while the light $L_0$ forms two lightwaves for each of the wavelength ranges, that is, six lightwaves in total. Then when the lights $L_0$, $L_{90}$ enter the second spatial light phase modulator 12A and are reflected thereon, the light $L_0$ as the six lightwaves are not modulated, while the light $L_{90}$ forms two lightwaves for each of the wavelength ranges, that is, six lightwaves in total. As described above, the light phase modulation element 11a and the light phase modulation element 12a (which are collectively referred to as the cell 1a), and the light phase modulation element 11b and the light phase modulation element 12b (which are collectively referred to as the cell 1b) have the same amounts of phase shift. Also, because the 4f optical system 41 is disposed between the first spatial light phase modulator 11A and the second spatial light phase modulator 12A, the lights $L_0$, $L_{90}$ reflected on the first and second spatial light phase modulators 11A, 12A become in phase for each of the cells 1a, 1b. The configuration as described above makes it possible for the spatial light phase modulator 1A to, similarly to the spatial light phase modulator 1 according to the aforementioned embodiment, phase-modulate all the lights in the polarization direction for each of the two-dimensionally arranged cells without polarization dependency.

The hologram recording device of the digital holography device 10A according to this variation can record a multiple hologram, similarly to the digital holography device 10 according to the aforementioned embodiment. Further, since the spatial light phase modulator 1A (the first and second spatial light phase modulators 11A, 12A) is realized by a LCOS-SLM, a high resolution and a high-speed response can be achieved. Even when a multiple hologram is divided either temporally or spatially, resolution of the reproduced image can be prevented from lowering.

In the digital holography devices 10, 10A according to the embodiment and the variation thereof, respectively, any number of wavelength ranges can be set as described above. Each of the digital holography devices 10, 10A may include a color filter array in which color filters in different colors are arranged in mosaic form on a light entrance surface of the image pickup device 2, which can subdivide a wavelength range of the light passing through the color filter. The spatial light phase modulators 1, 1A may be each realized by any medium as long as the medium has wavelength dependency and makes different radii of curvature on a wavefront for each of the cells 1a, 1b. The spatial light phase modulators 1, 1A as described may be each applied to not only a liquid-crystal spatial light modulator but also a light phase modulation element without birefringence, that is, without polarization dependency, such as a holographic optical element and a diffraction optical element.

In each of the digital holography devices 10, 10A, a liquid-crystal spatial light modulator is used as a spatial light phase modulator, which makes it possible to record a multiple hologram for reproducing an image containing information on a polarization direction and also to reproduce the original image from the multiple hologram. For that purpose, the first and the second spatial light phase modulators 11 (11A), 12 (12A) of the spatial light phase modulator 1 (1A) have the light phase modulation element 11a and the light phase modulation element 12a, and the light phase modulation element 11b and the light phase modulation element 12b, in which the former and the latter have amounts of phase modulation different from each other. With the configuration as described above, each of the x-polarized light $L_0$ and the y-polarized light $L_{90}$: is formed into two lightwaves independent from each other; and is multiplex-recorded as a multiple hologram having different interference pattern patterns by the image pickup device 2. In this case, the digital holography device 10A may or may not include the 4f optical system 41 between the first spatial light phase modulator 11A and the second spatial light phase modulator 12A. The polarization direction is not limited to two directions and may be three or more depending on the configuration of the spatial light phase modulator 1 (1A).

The multiple hologram as described above contains information on a polarization direction and also on a wavelength range, similarly to the aforementioned embodiment. For example, when wavelength ranges R, G, and B are used as three parameters, together with parameters of two polarization directions, the x and y directions, an image containing light having six parameters in total. Thus, N=6 is set and six to twelve multiple hologram depending on an image reproduction method of interest are time- or space-divided and recorded.

The digital holography devices 10, 10A according to this embodiment and the variation thereof, respectively, can divide a field of view of an object (to be imaged) OBJ as information and use the information as a plurality of parameters. Therefore, a hologram recording device of the digital holography devices 10, 10A each give different phase modulation patterns to the different divided fields of view of the object OBJ to serve as a system multiplex-recorded by the image pickup device 2. More specifically the hologram recording device includes: the spatial light phase modulators 1 (1A) as many as the divided fields of view; and an optical system in which light $L_{OBJ}$ exiting from the respective fields of view into the respective spatial light phase modulators 1. The image pickup device 2 multiplex-records an interference pattern formed by lightwaves generated by each of the spatial light phase modulators 1. Alternatively, the hologram recording device may: include a single unit of the spatial light phase modulator 1 (1A); and segment a region in accordance with the divided fields of view; and give different phase modulation patterns to the different segmented regions.

The digital holography devices 10, 10A according to this embodiment and the variation thereof, respectively, each includes the spatial light phase modulator having wavelength dependency, such as a liquid-crystal spatial light modulator. This makes it possible to, as described above, reproduce an image containing information for each wavelength range. Further, by converting the information on wavelength into time, the digital holography devices 10, 10A can each reproduce a three-dimensional image for each of a plurality of times, from a multiple hologram obtained in a one-time imaging, as a moving image exceeding a response time (a time resolution) of the image pickup device 2. Below is described a digital holography device according to another variation of the embodiment of the present invention and a hologram recording method and an image reproduction method, each of which uses the digital holography device, with reference to FIG. 8.

A digital holography device 10B according to a second variation of the embodiment of the present invention includes a multi-wavelength light source 3, a wavelength dispersion device 42, polarization beam splitters (PBSs) 43a, 43b, mirrors 44a, 44b, a light phase modulation element array 1B, the polarizer 47a, the image pickup device 2, and the computer 50. The multi-wavelength light source 3 and the wavelength dispersion device 42 are an optical system which emits pulsed light at different timing for each wavelength. In order to convert each of wavelength components into time information, an optical comb light source or a broad wavelength range pulsed light source is used as the multi-wavelength light source 3. The wavelength dispersion device 42 is made up of an optical element having wavelength dependency on a refractive index of a prism, a diffraction grating, or a combination thereof. The polarizer 47a and the light phase modulation element array 1B are stacked on an imaging surface of the image pickup device 2. The light phase modulation element array 1B is, similarly to the first and second spatial light phase modulators 11, 12 of the spatial light phase modulator 1 illustrated in FIG. 2, configured by two-dimensionally arranging light phase modulation elements having polarization dependency and wavelength dependency. An amount of phase shift of each of the light phase modulation elements may not be variable. The light phase modulation element array 1B as described above: is composed of two-dimensionally arranged birefringent optical element made of photonic crystal, liquid crystal material, metamaterial, a minute wave plate, or the like (see Patent Documents 1 and 2); and modulates a phase of polarization in one direction, herein, polarization in a lateral direction with respect to the plane of FIG. 8, depending on a wavelength. In the present variation, in order to record a plurality of space-divided multiple holograms, the light phase modulation element array 1B is configured to have cells (light phase modulation elements) arranged such that phase modulation patterns as many as the multiple hologram to be recorded are given. The polarizer 47a is disposed on a transmission axis which is tilted at a 45 degrees angle to each of p-polarization and s-polarization, which the polarization beam splitter 43a branches lightwaves thereof and are at right angles to each other.

Pulsed light irradiated from the multi-wavelength light source 3 turns to light L having different timings of pulsed light for each wavelength via the wavelength dispersion device 42. The polarization beam splitter 43a branches the light L into p-polarization that passes through an object and then goes straight and s-polarization that is reflected by the object. The s-polarization: has a polarization direction thereof in a perpendicular direction with respect to the plane of FIG. 8; and illuminates the object (to be imaged) OBJ, as an object light $L_{OBJ}$. At this time, the object light $L_{OBJ}$ illuminates the object OBJ at different timings for each wavelength. Meanwhile, the p-polarization having passed through the polarization beam splitter 43a travels, as a reference light $L_{Ref}$, in a light path different from that of the object light $L_{OBJ}$. The object light $L_{OBJ}$ and the reference light $L_{Ref}$ are multiplexed at a polarization beam splitter 43b and enters the light phase modulation element array 1B. The light phase modulation element array 1B modulates the reference light $L_{Ref}$ which is polarized light in the lateral direction of FIG. 8. The lights $L_{OBJ}$, $L_{Ref}$ made to travel in the same polarization direction by the polarizer 47a form an interference pattern for each wavelength, which is recorded as a multiple hologram by the image pickup device 2.

Figure 8:
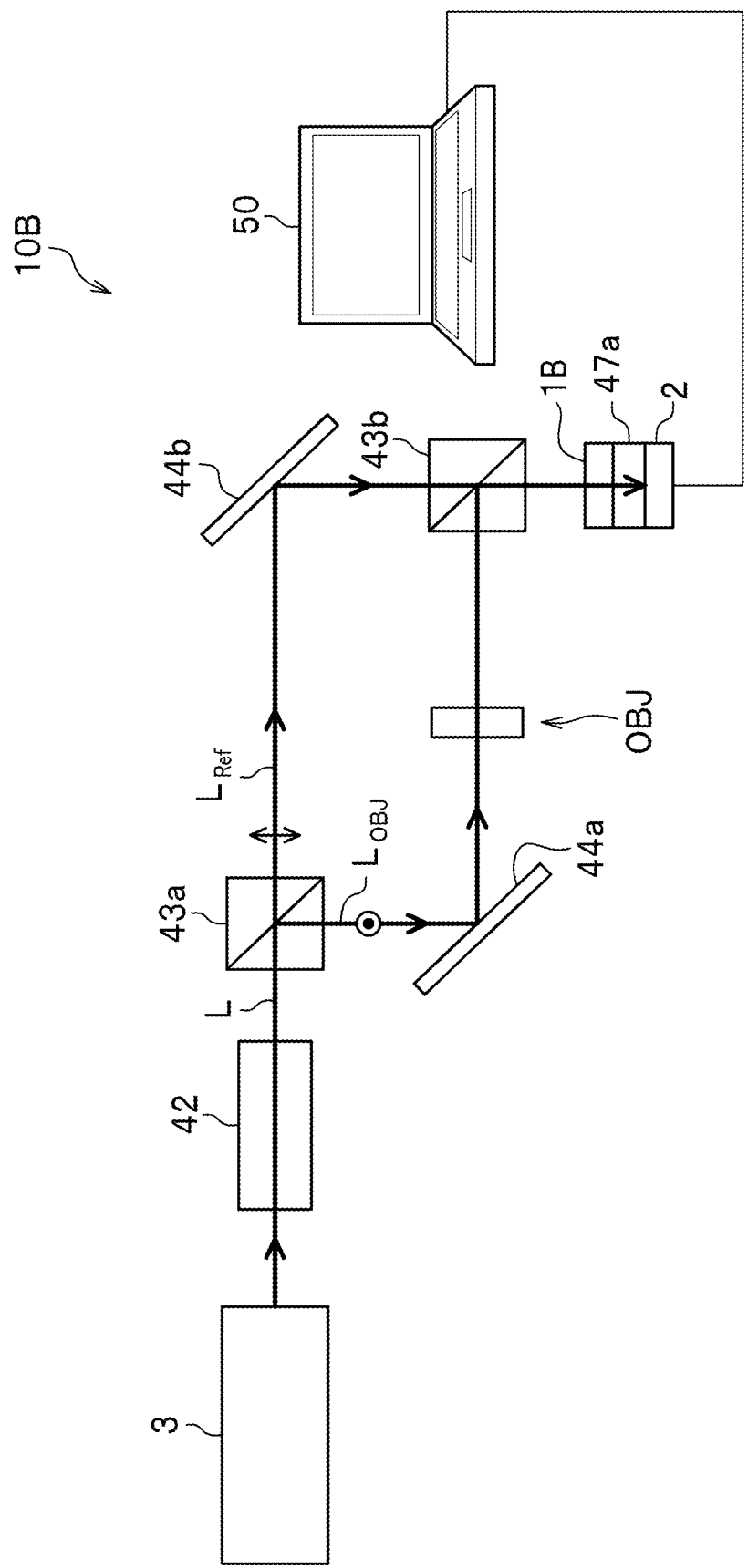
FIG. 8 is a schematic diagram for explaining a structure of a digital holography device according to a second variation of the embodiment of the present invention.

The digital holography device 10B according to this variation extracts, as described above, pixels one by one in a pair composed of a prescribed number of pixels of the image pickup device 2, from a single multiple hologram recorded by the image pickup device 2 obtained in a one-time imaging, to thereby, a prescribed number of multiple holograms. The image reproduction method according to the aforementioned first or second embodiment restores a lightwave for each wavelength from those multiple holograms. A reproduced image for the each wavelength contains three-dimensional information on the object OBJ at different times, thus allowing a three-dimensional moving image to be obtained at one-time exposure (measurement). By using the image reproduction device according to this variation, a space density of the light phase modulation element array 1B can be increased and a high-definition image can be thus reproduced. Also, by using the image reproduction device, compared to a case in which an image reproduction device according to the related art designs the light phase modulation element array 1B, more information on a wavelength (a time) can be recorded even at the same space density. This can make moving image record time longer. Note that FIG. 8 illustrates the object OBJ such that light passes through the object OBJ. The object OBJ may, however, reflect the light. The wavelength dispersion device 42 may be disposed in respective light paths between the polarization beam splitter 43a and the object OBJ and between the polarization beam splitters 43a, 43b. The digital holography device 10B according to this variation may include, in place of the light phase modulation element array 1B, the first spatial light phase modulator 11 of the spatial light phase modulator 1

A hologram recording method and an image reproduction method using the digital holography devices 10, 10A according to the embodiment and the variation thereof, respectively, (which are hereinafter referred to as a hologram recording method and an image reproduction method of the present invention, respectively) can be carried out by applying a known optical microscope to the hologram recording device. One of the examples is described assuming a case using a fluorescence microscope, with reference to FIG. 9. A digital holography device 10C illustrated in FIG. 9 includes the excitation light source 3A, the dichroic mirror 45, magnification optical systems (lenses) 41a, 41b, an eyepiece 41c, an excitation light shielding element 46, the mirror 44, the polarizers 47a, 47b, birefringent materials 48a, 48b, 48c, the spatial light phase modulator 11A, the image pickup device 2, and the computer 50. With the structure, a multiple hologram in which an image made of a fluorescent sample can be reproduced as the object OBJ can be recorded and an image can be reproduced from the multiple hologram.

The excitation light source 3A emits light that simultaneously excites a plurality of fluorescent bodies with respective luminescent colors different from each other (excitation light). The spatial light phase modulator 11A herein: is the same as the first spatial light phase modulator 11A of the spatial light phase modulator 1A illustrated in FIG. 7; and phase-modulates a polarized light in one direction, herein, in a 0-degree direction or a 90-degree direction according to a wavelength, which will be described later. The dichroic mirror 45: reflects the excitation light emitted from the excitation light source 3A and lets fluorescence eradiated from the fluorescent sample OBJ pass therethrough. The excitation light shielding element 46: blocks the excitation light; and lets the fluorescence pass therethrough. Both the dichroic mirror 45 and the excitation light shielding element 46 are optical elements disposed so as to separate the excitation light and the fluorescence; and block the excitation light and let the fluorescence pass through. Thus, each of the dichroic mirror 45 and the excitation light shielding element 460 preferably has an entire fluorescence wavelength spectrum range set as a transparent wavelength region, so as to prevent the fluorescence from being reduced. More specifically, for example, a long pass filter may be set which, with respect to fluorescence at a wavelength from 510 nm to 700 nm, lets light of equivalent to or higher than the 510 nm wavelength pass through. As a result, the fluorescence can be clearly imaged without a wavelength spectrum shape of the fluorescence being deformed by the dichroic mirror 45 or the excitation light shielding element 46. The polarizers 47a, 47b are disposed in a 45-degree direction and a 135-degree direction with respect to a pass-through axis, respectively.

The excitation light emitted from the excitation light source 3A: is reflected on the dichroic mirror 45; passes through the magnification optical system 41a from a side of the eyepiece 41c; and thus illuminates the fluorescent sample OBJ with a radius of a luminous flux of the excitation light reduced. Fluorescence having a plurality of different wavelength spectra is emitted from the fluorescent sample OBJ. The fluorescence: sequentially passes through the eyepiece 41c, the magnification optical system 41a, the dichroic mirror 45, and the excitation light shielding element 46 in this order; and is reflected on the mirror 44. Part of the excitation light: passes through the eyepiece 41c from a side of the fluorescent sample OBJ, together with the fluorescence; and is the separated from the fluorescence by the dichroic mirror 45 and the excitation light shielding element 46. Of the fluorescence reflected on the mirror 44, linearly polarized light in a 45-degree direction passes through the polarizer 47a. The fluorescence as the linearly polarized light in the 45-degree direction: is subject to adjustment in a phase difference between respective components of a 0-degree polarized light and a 90-degree polarized light by the birefringent material 48a, so as to improve a degree of visibility of an interference pattern to be finally obtained; passes through the lens 41b; and enters the reflective spatial light phase modulator 11A. The spatial light phase modulator 11A gives an amount of phase modulation to each of the 0-degree and 90-degree polarized light component in accordance with a wavelength thereof. The birefringent material 48b gives respective different wavefront modulations to the 0-degree and 90-degree polarized light component of the light emitted from the spatial light phase modulator 11A. More specifically, the birefringent material 48b gives thereto respective phase distributions of spherical waves with different radii of curvature according to the polarization directions. Respective lightwaves of the polarized light in the 0-degree and 90-degree directions are thus generated with the radii of curvature thereof different from each other. Then, the birefringent material birefringent material 48c adjusts a difference between respective lengths of polarized light path in the 0-degree and 90-degree directions and also a difference between respective radii of curvature thereof, so as to improve a degree of visibility of an interference pattern to be finally obtained. A polarizer 47b in a 45-degree direction with respect to the pass-through axis then aligns the polarization directions of the two lightwaves, to thereby generate an interference pattern for each wavelength. The image pickup device 2 records the generated interference patterns as a multiple hologram. At this time, as explained in the aforementioned embodiment, the spatial light phase modulator 11A gives an amount of phase modulation to a lightwave at at least one wavelength range different from that given to the other lightwaves, based on which the image pickup device 2 records a plurality of multiple holograms while changing the amount of phase modulation.

In applying the hologram recording method and the image reproduction method of the present invention to the fluorescence microscope, a multiple hologram required for image reproduction can be obtained with a small amount of light and with a small number of measurement, which allows a high-speed measurement with a weak light. This makes it possible to reduce damage to an object to be imaged, especially when the object is a living organism. Also, when an image pickup device equipped with a light phase modulation element array and a polarizer is used, a space density of the light phase modulation element array can be increased, thus allowing an even higher quality image to be obtained. Note that when a plurality of multiple holograms are recorded with space division, in place of the spatial light phase modulator 11A, the light phase modulation element array 1B which is stacked one on an imaging surface of the image pickup device 2, together with the polarizer 47b, can be used (see FIG. 8). This can increase a space density of the light phase modulation element array 1B, which allows a high quality image to be reproduced.

Figure 10:
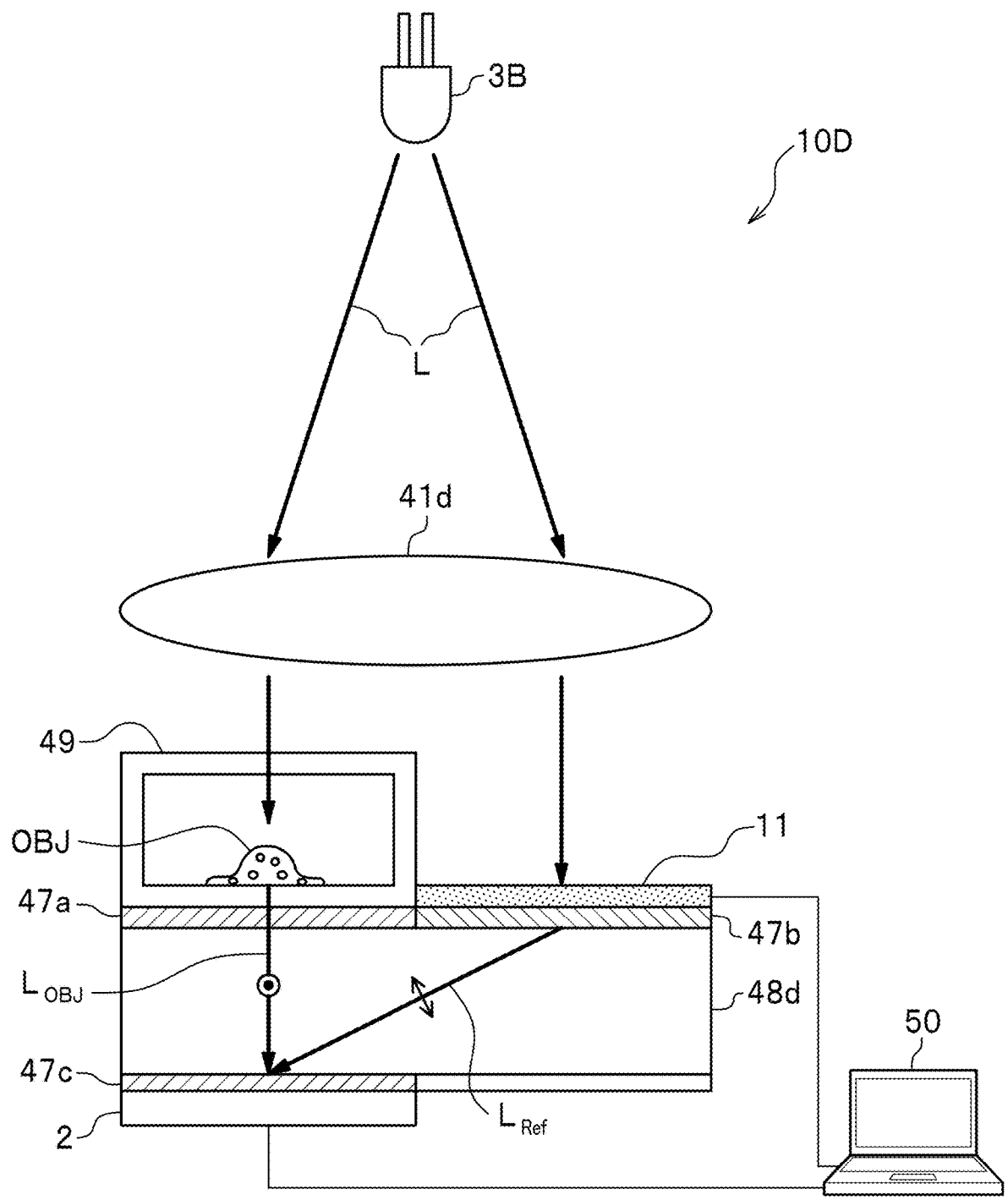
FIG. 10 is a schematic diagram for explaining a structure of a digital holography device equipped with a quantitative phase microscope according to an embodiment of the present invention.

Another example in which a quantitative phase microscope is used is described below with reference to FIG. 10. A digital holography device 10D illustrated in FIG. 10 includes an incoherent optical source 3B such as LED, a collimator (lens) 41d, the spatial light phase modulator 11, polarizers 47a, 47b, 47c, the birefringent material 48d, a glass cell 49 which houses therein a sample (the object OBJ), the image pickup device 2, and the computer 50. The glass cell 49 and the spatial light phase modulator 11 are disposed side by side on a plane perpendicular to an optical axis. The polarizer 47a placed just under the glass cell 49 and the polarizer 47b placed just under the spatial light phase modulator 11 are also disposed side by side. The birefringent material 48d is disposed under the side-by-side polarizers 47a, 47b. The polarizer 47c is disposed under the birefringent material 48d and just under the glass cell 49 and the polarizer 47a. The image pickup device 2 is disposed just under the polarizer 47c. The spatial light phase modulator 11 herein: is the same as the first spatial light phase modulator 11 of the spatial light phase modulator 1A illustrated in FIG. 2; and phase-modulates a polarized light in one direction, herein, in a pass-through axis direction of the polarizer 47b (the polarized light in the lateral direction in FIG. 10) according to a wavelength. The polarizer 47a and the polarizer 47b have respective pass-through axes perpendicular to each other. The polarizer 47c has a pass-through axis tilted at a 45 degrees angle with respect to those of the polarizers 47a, 47b. Note that the spatial light phase modulator 11 and the polarizer 47b may be disposed interchangeably. The birefringent material 48d: is made of calcite ($CaCO_3$) or the like; and has an optical axis thereof such that the linearly polarized light passing through the polarizer 47b is refracted. The glass cell 49 is rotatable in the three axial directions.

Light L: is emitted from the incoherent optical source 3B; and enters the collimator 41 to become a parallel light. Part of the light L as the parallel light: passes through the glass cell 49; and enters the object OBJ. Another part enters the spatial light phase modulator 1. $L_{OBJ}$ emitted from the object OBJ (object light) passes through the polarizer 47a, from which a linearly polarized light in a perpendicular direction with respect to the plane of FIG. 10 is emitted. The light $L_{OBJ}$ which has become the linearly polarized light: travels straight through the birefringent material 48d; and enters the polarizer 47c on the image pickup device 2. In the meanwhile, A light $L_{Ref}$ passing through the spatial light phase modulator 11 and the polarizer 47b (a reference light): becomes a linearly polarized light in a direction perpendicular to the light $L_{OBJ}$; and also becomes spherical waves having different radii of curvature, after the spatial light phase modulator 11 generate lightwaves as many as the number of recorded multiple holograms for each wavelength range from the light $L_{Ref}$. The light $L_{Ref}$ as the linearly polarized light: is refracted by and passes through the birefringent material 48d; and enters the polarizer 47c on the image pickup device 2. The lights $L_{OBJ}$, $L_{Ref}$ having the same polarization directions by the polarizer 47c: form an interference pattern for each wavelength range; and are recorded as a multiple hologram by the image pickup device 2.

By applying the hologram recording method and the image reproduction method of the present invention to the quantitative phase microscope, a multiple hologram required for image reproduction can be obtained with a small amount of light and with a small number of measurement, which allows a high-speed measurement with a weak light. This makes it possible to reduce damage to an object to be imaged, especially when the object is a living organism. Also, even when a sample is transparent, a three-dimensional imaging is possible based on information on a quantitive phase, which can eliminate a need for staining a sample. Further, when a multiple hologram is recorded while rotating in the three axes directions using the glass cell 49, a three-dimensional tomographic image of a transparent sample can be obtained without staining.

The embodiments for carrying out the image reproduction device, the hologram recording device, and the digital holography device of the present invention have been described above. The present invention is not, however, limited to those embodiments and various changes can be made thereto without departing from the scope of the technical spirit of the appended claims.

Example 1

Figure 11:
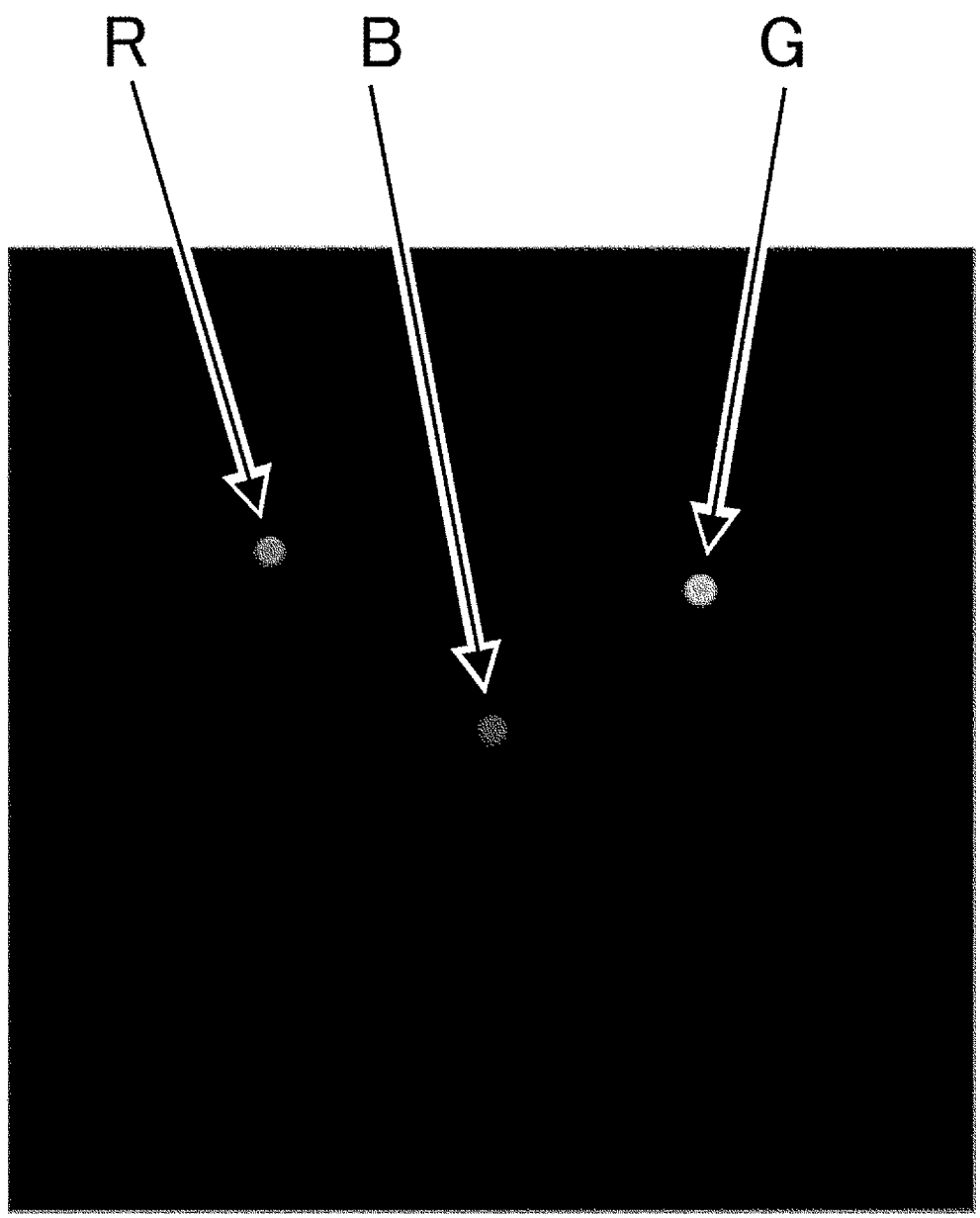
FIG. 11 is an image of an object to be imaged for simulation using a digital holography device according to an Example of the present invention.

In order to verify the advantageous effects of the present invention, a simulation was performed in which the digital holography device according to the variation of the embodiment of the present invention illustrated in FIG. 7 recorded a hologram and reproduced an image of the hologram, using Microsoft visual studio 2017. As illustrated in FIG. 11, objects (to be imaged) used were three spherical luminous bodies each 64 μm in diameter in different colors, namely, red (R), green (G), and blue (B). The red luminous body was at a central wavelength of 618 nm; the green, 545 nm; and, the blue, 461 nm, each of which had a rectangular wavelength spectrum with a wavelength width±5 nm (10 nm in total) with respect to the central wavelength. In calculation, the wavelength interval was 0.1 nm, and thus, each of the luminous bodies was calculated as a hologram having one wavelength range containing 101-wavelength multiple holograms.

The image pickup device had a 512×512 array with each pixel 4 μm in size. Each of a first spatial light modulator and a second spatial light modulator had a 512×512 array with each pixel 4 μm in size. A cell with two lightwaves generated therein was set using pseudorandom function. A division ratio (an intensity ratio) of the two lightwaves was 1:1. A phase distribution of a spherical wave without reflection is given to a generation region of one of the two lightwaves, and an amount of phase shift relative to another generation region of the other. Specific values thereof will be described hereinafter.

A distance between the object and the first spatial light modulators was adjusted such that a diffraction light from the object was cast in the first and second spatial light modulators. A distance between the second spatial light modulator and the image pickup device was adjusted such that an interfering light of two lightwaves was cast in the image pickup device. A multiple hologram having interference patterns in three wavelength ranges was imaged six times while changing respective amounts of phase shift. The amounts of phase shift of the multiple holograms were as set as follows at wavelengths of 618 nm, 545 nm, and 461 nm, respectively:

| | |
|---|---|
| $[-(434/360)\times 2\pi, -3\pi, -4\pi]$ | 1: |
| $[-(217/360)\times 2\pi, -3\pi/2, -2\pi]$ | 2: |
| $[0,0,0]$ | 3: |
| $[(217/360)\times \pi/2, 3\pi/8, \pi/2]$ | 4: |
| $[(217/360)\times 2\pi, 3\pi/2, 2\pi]$ | 5: |
| $[(434/360)\times 2\pi, 3\pi, 4\pi]$ | 6: |

Figure 12:
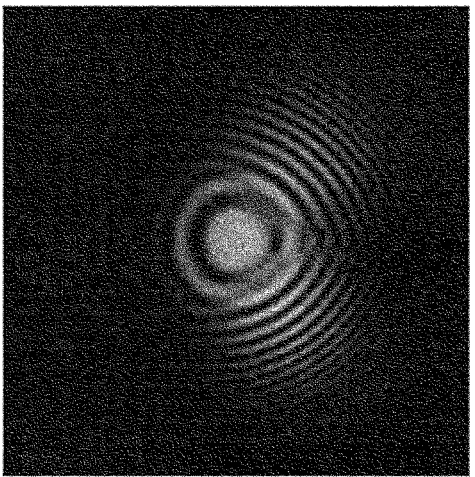
FIG. 12 is a photo of a multiple hologram of the object illustrated in FIG. 11 in a simulation by the digital holography device illustrated in FIG. 7, with a multiple hologram having a focal point distance of a spherical wave at 50 mm.
Figure 12:
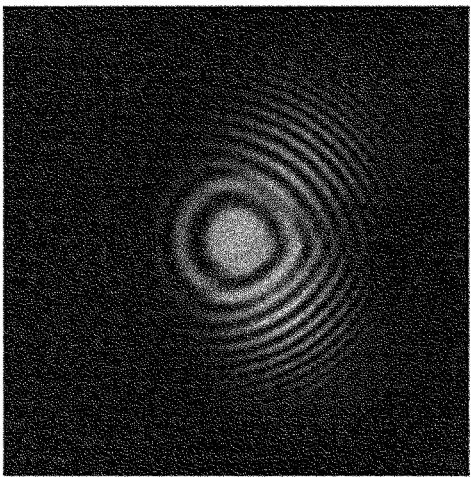
Figure 12:
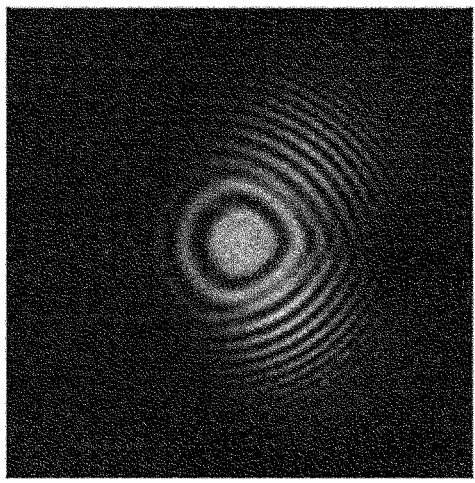
Figure 12:
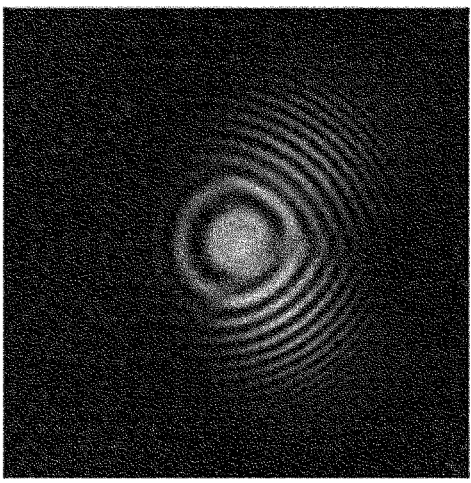
Figure 12:
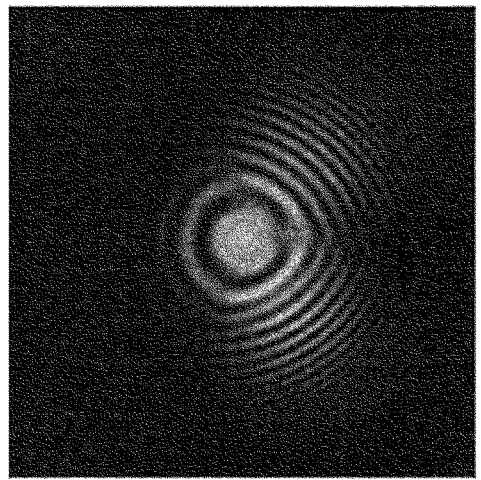
Figure 12:
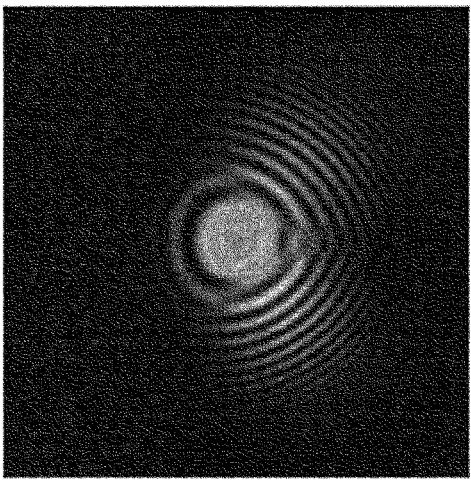
Figure 13:
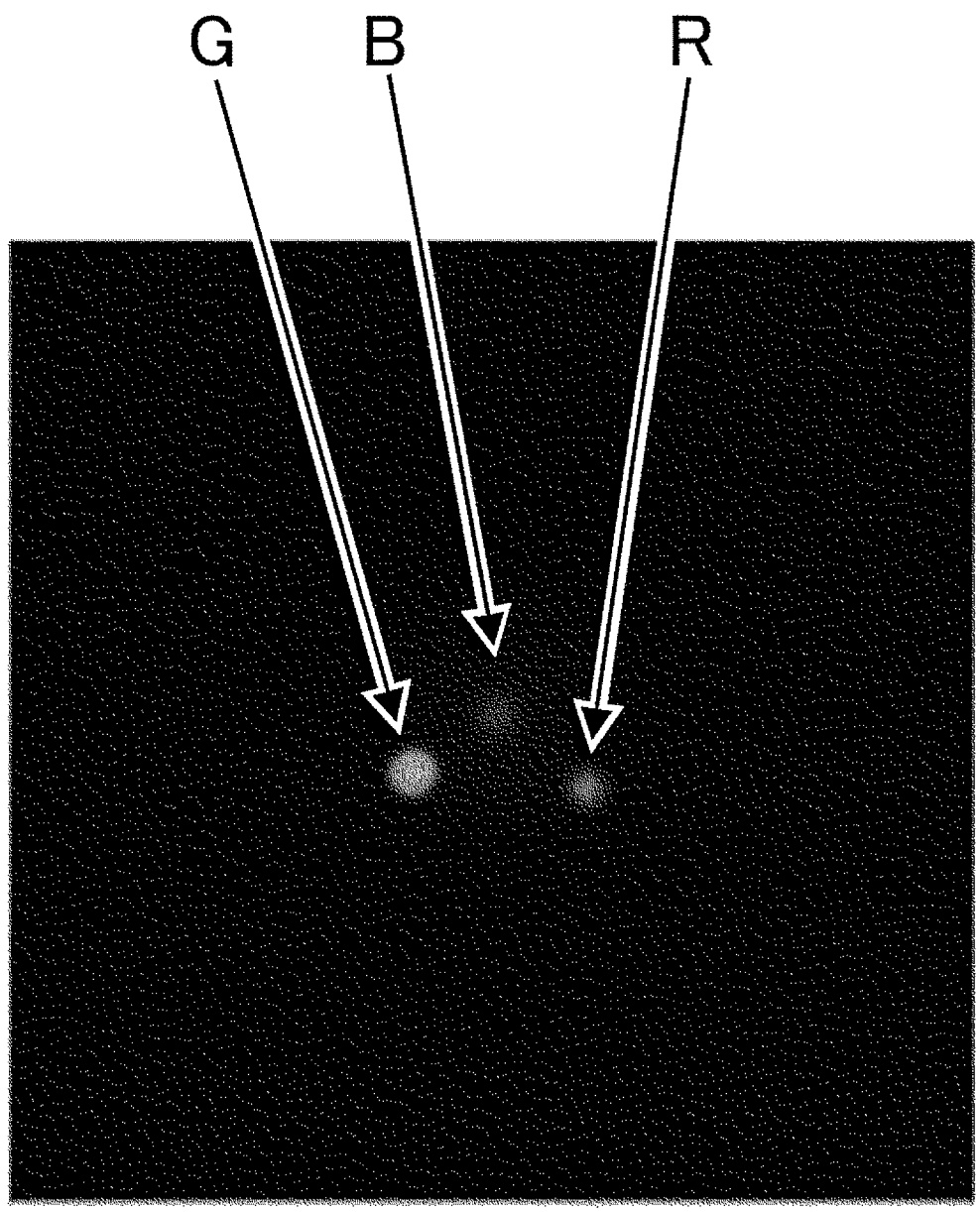
FIG. 13 is a photo of an image reproduced from the multiple hologram illustrated in FIG. 12.

FIG. 12 illustrates six multiple holograms under such a condition that: the distance between the object and the first spatial light modulator was 50 mm; the distance between the second spatial light modulator and the image pickup device was 20 mm; and a focal point distance of the spherical wave generated by the first and second spatial light modulators was 50 mm. FIG. 13 illustrates a reproduced image created by the image reproduction method according to the second embodiment of the present invention (see FIG. 6), from the six multiple holograms. More specifically, the image reproduction method: restored a lightwave for each wavelength range of each of green and blue, based on which an image was reproduced; restored a lightwave for each wavelength range of red, based on which another image was reproduced; and the two images were subjected to color synthesis The color synthesis image was rotated 180 degrees about the center thereof, using a birefringent lens pattern indicated by the spatial light modulator, to thereby obtain the reproduced image illustrated in FIG. 13.

Figure 14:
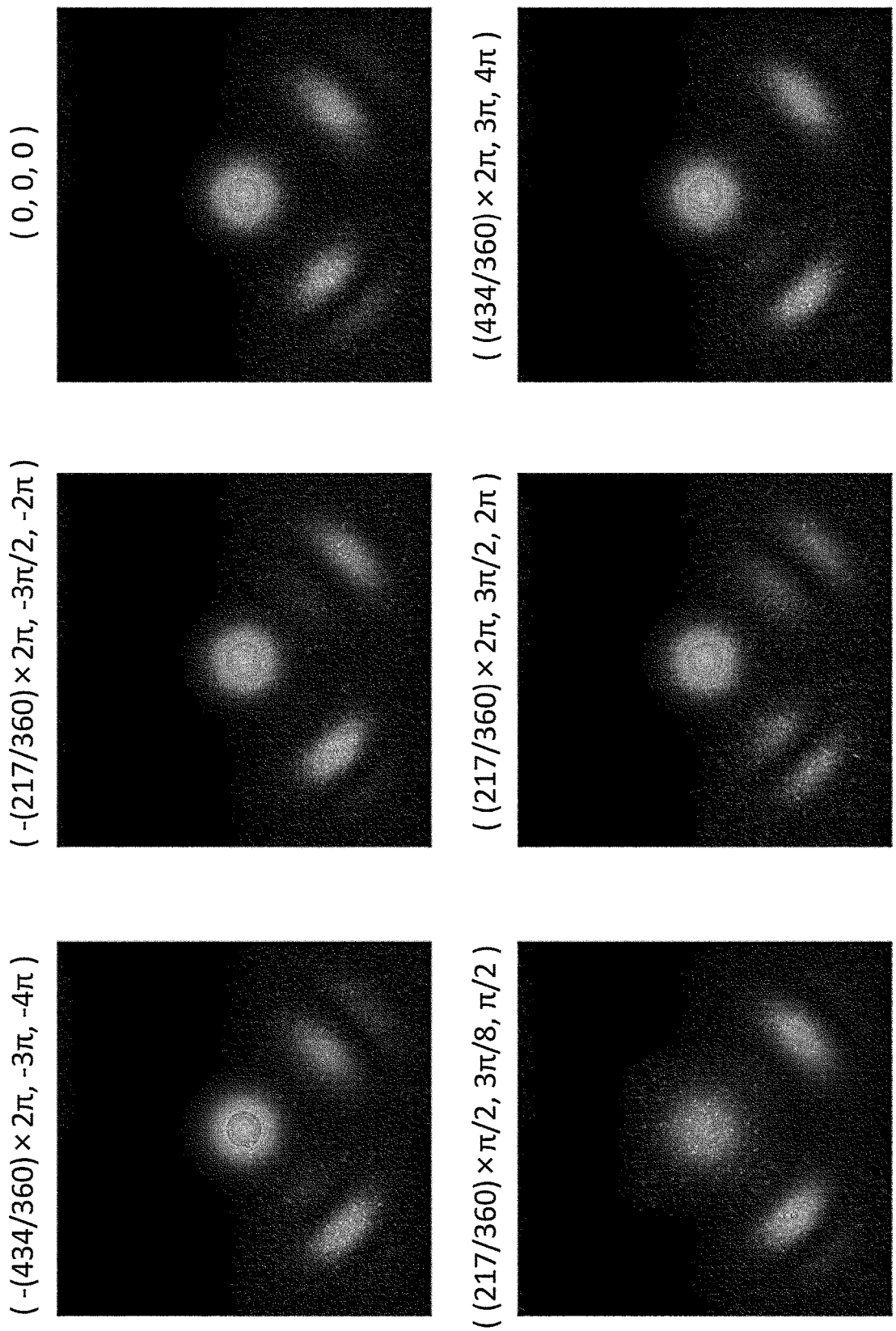
FIG. 14 is a photo of a multiple hologram of the object illustrated in FIG. 11 in a simulation by the digital holography device illustrated in FIG. 7, with a multiple hologram having a focal point distance of a spherical wave at 340 mm.
Figure 15:
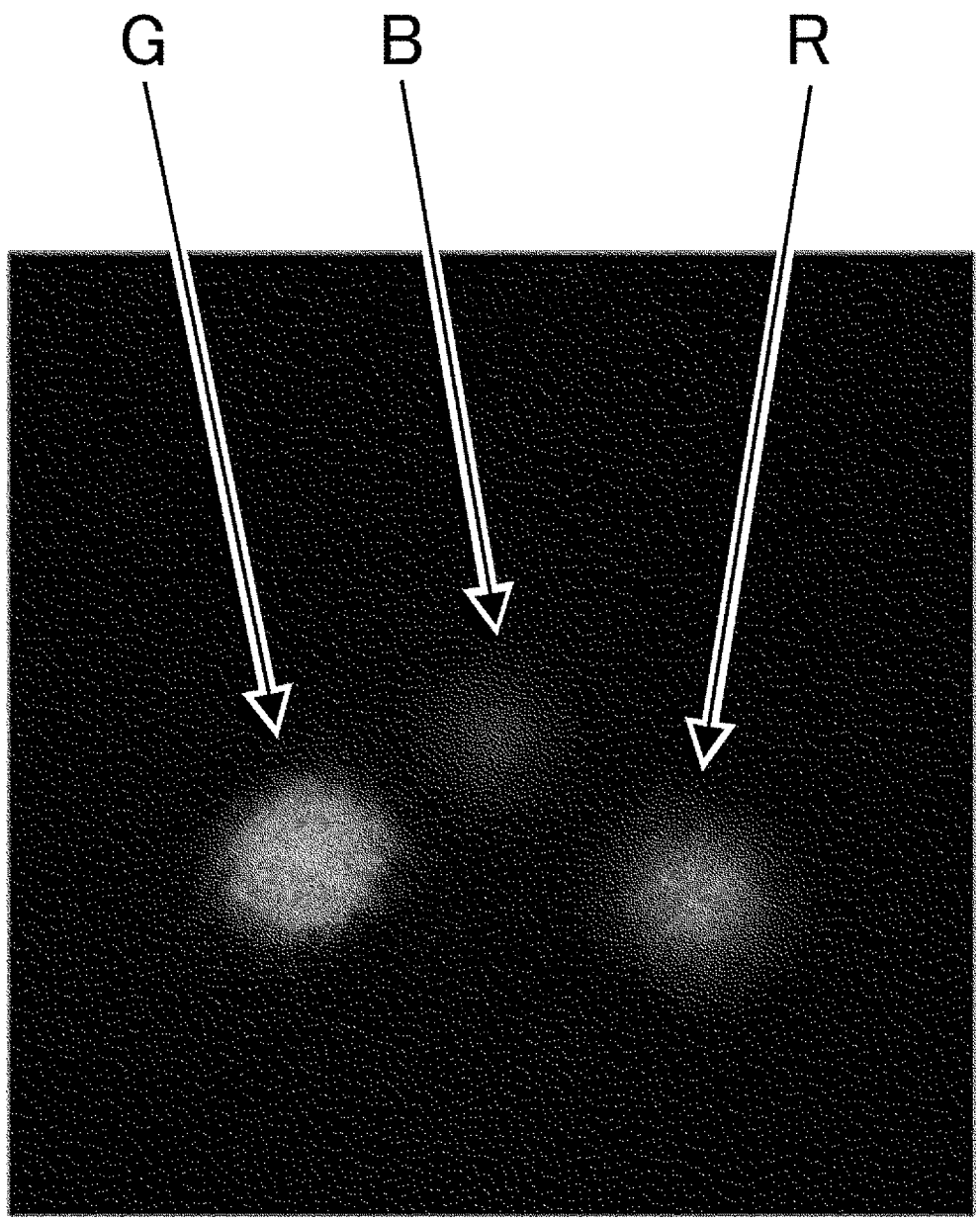
FIG. 15 is a photo of an image reproduced from the multiple hologram illustrated in FIG. 14.

FIG. 14 illustrates six multiple holograms under such a condition that: the distance between the object and the first spatial light modulator was 25 mm; the distance between the second spatial light modulator and the image pickup device was 5 mm; and a focal point distance of the spherical wave generated by the first and second spatial light modulators was 340 mm. FIG. 15 illustrates a reproduced image similarly created by the aforementioned image reproduction method, from the six multiple holograms, in which an image was reproduced for each wavelength range and the obtained images were subjected to color synthesis. Because the image of the three objects illustrated in FIG. 11 and information on the wavelengths were successfully reproduced under the two conditions, it was confirmed that the principle of the image reproduction method using the image reproduction device of the present invention was appropriate. It was also confirmed that, when the focal point distance of the spherical wave generated by the spatial light modulator was made shorter, the resolution of the digital holography device was improved.

Example 2

Figure 16:
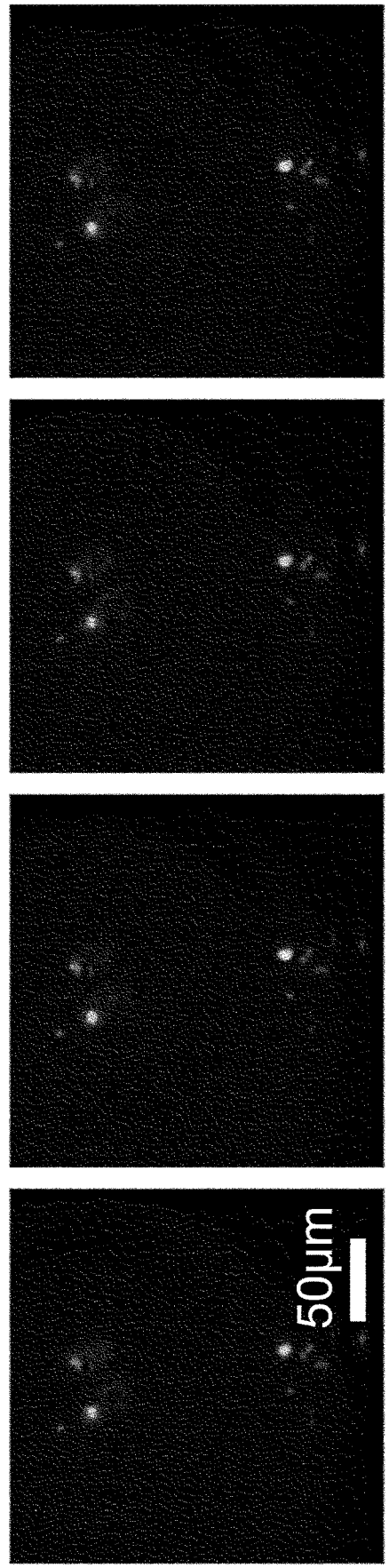
FIG. 16 is a photo of a multiple hologram created by imaging a fluorescent sample using a digital holography device according to an Example of the present invention.

In order to verify the advantageous effects of the present invention, a hologram was recorded and an image of the hologram was reproduced, using the digital holography device equipped with the fluorescence microscope illustrated in FIG. 9. Objects (to be imaged) prepared herein were fluorescent samples of two types, namely, europium complex and terbium complex having fluorescent central wavelengths of 618 nm and 545 nm, respectively. The fluorescent sample each had approximately 10 μm in diameter. Four multiple fluorescent holograms illustrated in FIG. 16 were recorded while giving thereto amounts of phase modulation of $(-210\pi/127, -2\pi)$, $(-105\pi/254, -\pi/2)$, $(0, 0)$, and $(210\pi/127, 2\pi)$ for each central wavelength.

Figure 17A:
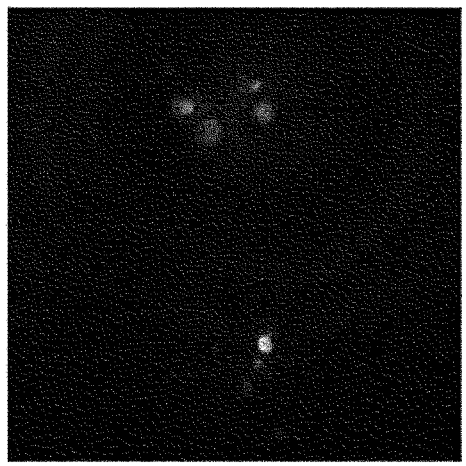
FIG. 17A is a photo of an image for each wavelength, reproduced from the multiple hologram illustrated in FIG. 16.
Figure 17A:
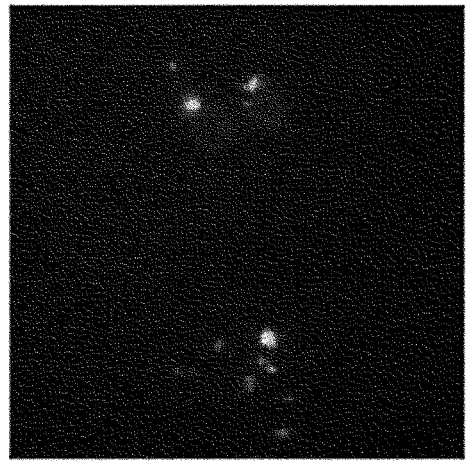
Figure 17B:
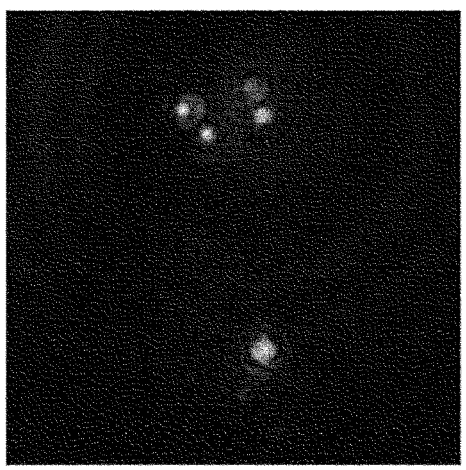
FIG. 17B is a photo of an image for each wavelength at a depth of 75 μm from an imaging surface, reproduced from the multiple hologram illustrated in FIG. 16.
Figure 17B:
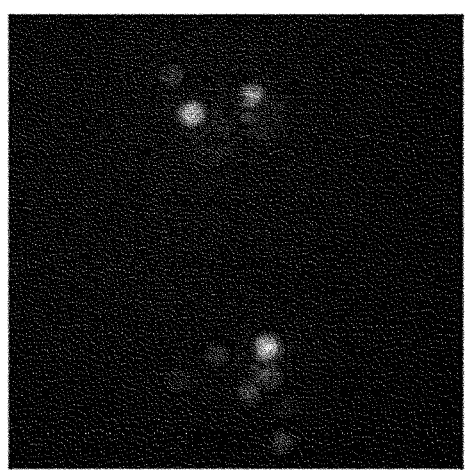
Figure 17C:
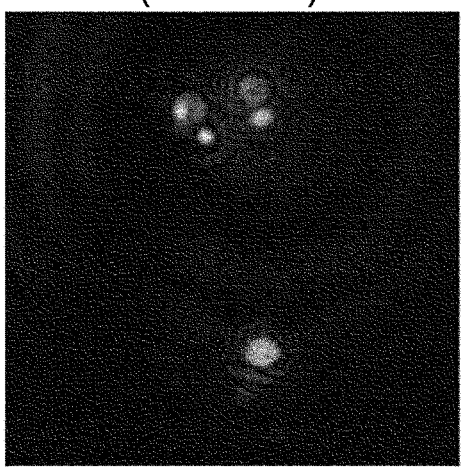
FIG. 17C is a photo of an image for each wavelength at a depth of 106 μm from an imaging surface, reproduced from the multiple hologram illustrated in FIG. 16.
Figure 17C:
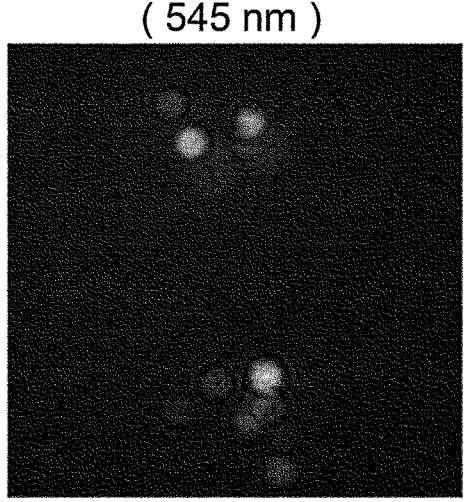
Figure 18A:
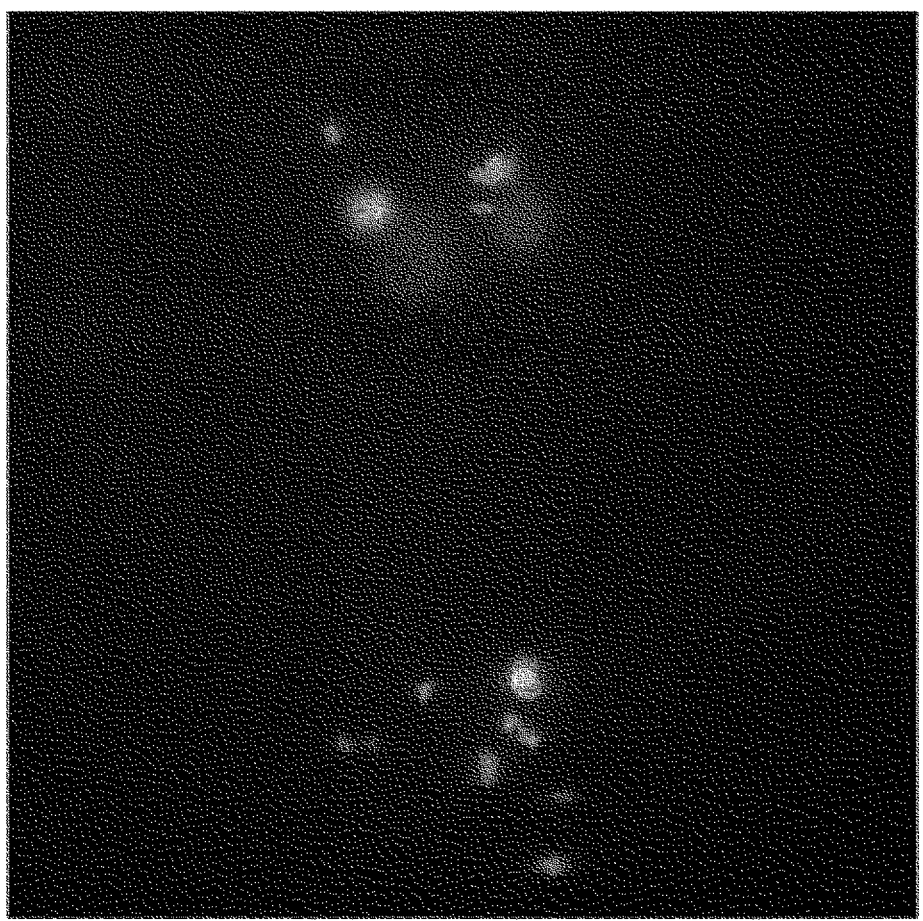
FIG. 18A is a photo of an image reproduced from the multiple hologram illustrated in FIG. 16.
Figure 18B:
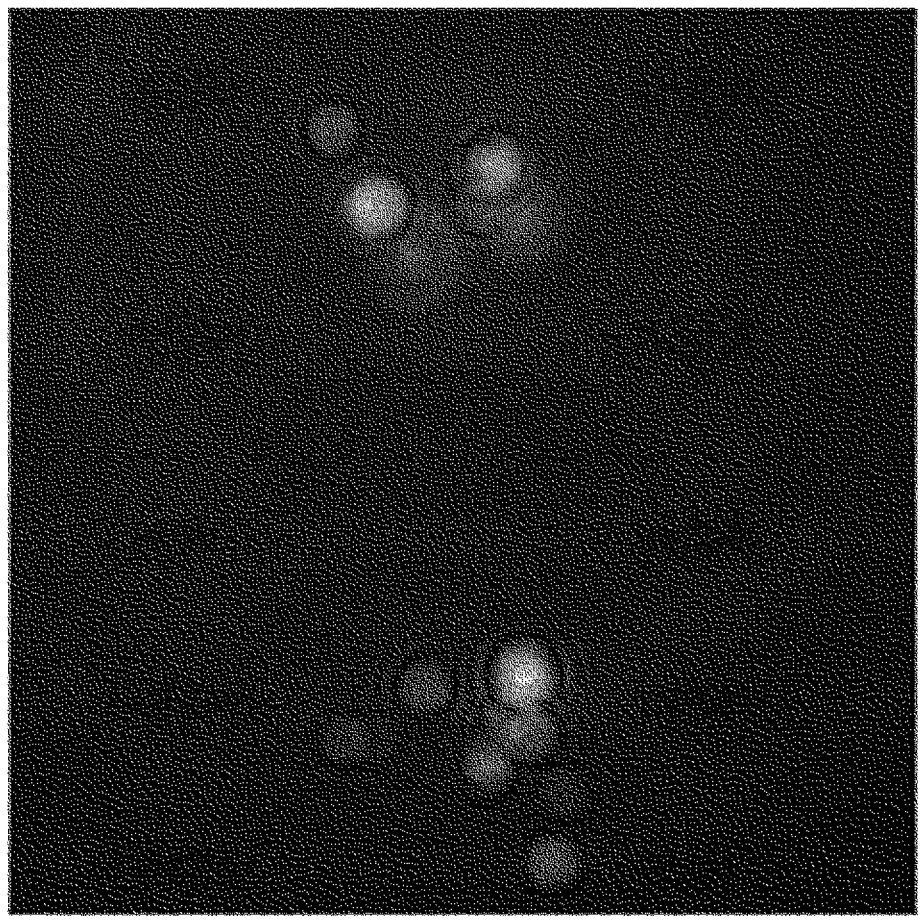
FIG. 18B is a photo of an image for each wavelength at a depth of 75 μm from an imaging surface, reproduced from the multiple hologram illustrated in FIG. 16.
Figure 18C:
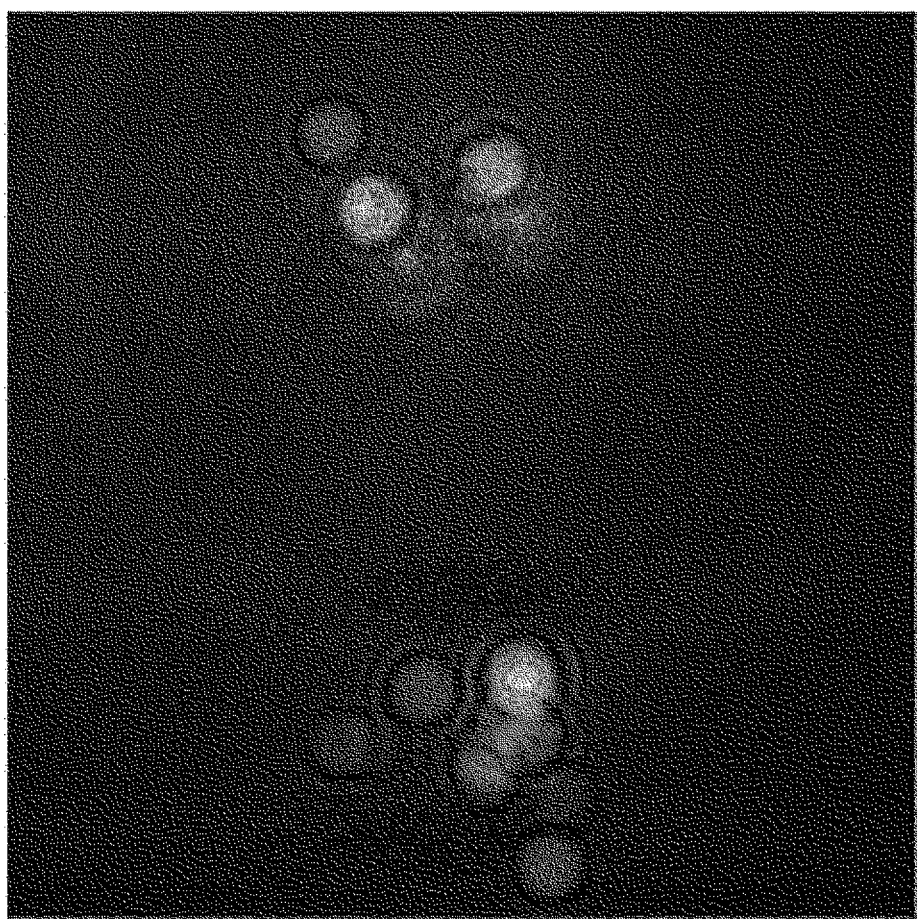
FIG. 18C is a photo of an image for each wavelength at a depth of 106 μm from an imaging surface, reproduced from the multiple hologram illustrated in FIG. 16.

From the four recorded multiple holograms, the image reproduction method according to the second embodiment of the present invention (see FIG. 6): restored a lightwave of green (at a central wavelength of 545 nm), based on which an image was reproduced; restored a lightwave of red (at a central wavelength of 618 nm), based on which another image was reproduced. FIG. 17A illustrates images at each of the wavelengths on an imaging surface. FIG. 18A illustrates an image subjected to color synthesis. Then, a lightwave at a depth of 75 μm with respect to the imaging surface is calculated from a lightwave of each of the restored lightwaves in the respective colors on the imaging surface, using the diffraction integral. FIG. 17B illustrates respective images of the restored wavelengths, and FIG. 18B illustrates an image subjected to color synthesis. Similarly, FIG. 17C illustrates respective images of the restored wavelengths at the depth of 106 μm with respect to the imaging surface, and FIG. 18C illustrates an image subjected to color synthesis. As described above, in color multiple incoherent digital holography using computational coherent multiplexing, it was confirmed that by using the image reproduction method of the image reproduction device of the present invention: the number of measurement of fluorescent bodies of two different types can be reduced to four, twice the number of parameters; the fluorescent bodies can be distinguished from each other by fluorescent color; and a sample approximately 10 μm in diameter can be measured at the depth of about 100 μm.

DESCRIPTION OF REFERENCE NUMERALS 10, 10A, 10B, 10C, 10D digital holography device
1, 1A spatial light phase modulator (lightwave generator)
2 image pickup device
11, 11A first spatial light phase modulator (first spatial light phase modulation part)
11a, 11b light phase modulation element
12, 12A second spatial light phase modulator (second spatial light phase modulation part)
12a, 12b light phase modulation element
2 image pickup device
3 multi-wavelength light source 3A excitation light source
3B incoherent light source
41 4f optical system
41a, 41b lens
42 wavelength dispersion device
43a, 43b polarization beam splitter
45 dichroic mirror
46 excitation light shielding element
47a, 47b, 47c polarizer
48a, 48b, 48c, 48d birefringent material
50 computer (PC)
5 recording controller
51 spatial light phase modulator control part
52 image pickup device control part
6, 6A image reproduction device
61 multiple hologram acquisition part
62 storage part
63 parameter selection part
64 hologram generation part
65 lightwave restoration part
66a first lightwave restoration part
66b second lightwave restoration part
67a first hologram generation part
67b second hologram generation part
68 amplitude and phase calculation part
69 image reproduction part
S1, S1A multiple hologram acquisition step
S21 parameter selection step
S22 hologram generation step
S23 lightwave restoration step
S25 first lightwave restoration step
S26 first hologram generation step
S27 second hologram generation step
S28 second lightwave restoration step
S3 amplitude and phase calculation step
S4 image reproduction step

The invention claimed is:

1. An image reproduction device which reproduces, from not less than N and not more than 2N multiple holograms, an image which contains N parameters for each of one or more pieces of optical information selected from a wavelength range, a polarization direction, and a measurement region, or N combinations thereof, the multiple holograms being time- or space-divisionally multiplex-recorded therein N patterns of interference patterns each formed by two lightwaves of which phases are different for each parameter, a phase of at least one of lightwaves of 2N types in total being different from each other, the image reproduction device, comprising:
a parameter selection part configured to select a parameter one by one from the N parameters;
a hologram generation part configured to, when the parameter selection part selects the parameter, remove an interference pattern of (N−1) patterns other than an interference pattern formed by two lightwaves having the selected parameter, from at least one of the multiple holograms, and generate a computer generated hologram containing the two lightwaves; and
a lightwave restoration part configured to restore one of the two lightwaves from the computer generated hologram generated by the hologram generation part,
wherein, after the lightwave restoration part restores one or more lightwaves, in order to generate a computer generated hologram containing two lightwaves having a parameter different from the restored lightwave, the hologram generation part uses either or both the lightwave having been restored by the lightwave restoration part and the computer holograms having been used for restoring the lightwave.

2. An image reproduction device which reproduces, from 2N multiple holograms, an image which contains N parameters for each of one or more pieces of optical information selected from a wavelength range, a polarization direction, and a measurement region, or N combinations thereof, the multiple holograms being time- or space-divisionally multiplex-recorded therein N patterns of interference patterns each formed by two lightwaves of which phases are different for each parameter, the image reproduction device, comprising:
a first lightwave restoration part configured to restore, from (2N−1) multiple holograms, lightwaves of (N−1) types as one of two lightwaves forming each of (N−1) patterns of interference patterns other than the N-th interference pattern, the (2N−1) multiple holograms being the 2N multiple holograms other than the 2N-th multiple hologram, the (2N−1) multiple holograms also having a phase of at least one of lightwaves of 2N types forming the N interference patterns;
a first hologram generation part configured to, using the lightwave restored by the first lightwave restoration part, remove interference patterns of (N−1) patterns other than the N-th interference pattern, from at least one of the multiple holograms other than the 2N-th multiple hologram, to thereby generate a first computer generated hologram;
a second hologram generation part configured to, using the lightwave restored by the first lightwave restoration part, remove interference patterns of (N−1) patterns other than the N-th interference pattern, from the 2N-th multiple hologram, to thereby generate a second computer generated hologram; and
a second lightwave restoration part configured to restore one of two lightwaves forming the N-th interference pattern, from the first computer generated hologram and the second computer generated hologram, using phase-shifting technique.

3. A hologram recording device, comprising:
a lightwave generator that generates, from a lightwave of an object, a lightwave having N parameters for each of one or more pieces of optical information selected from a wavelength range, a polarization direction, and a measurement region, or N combinations thereof, the generated lightwave being two or more in number, the two or more lightwaves having respective phases different from each other; and
an image pickup device that allows the lightwave generated by the lightwave generator enter therein and multiplex-records two or more patterns of interference patterns formed by two lightwaves having the same parameter and different phases, as a multiple hologram,
wherein the two or more patterns of the interference patterns are time- or space-divided and recorded, to thereby record a plurality of multiple holograms, and
wherein the lightwave has a phase different from at least one of lightwaves forming the two or more patterns of the interference patterns recorded in each of a plurality of the multiple holograms.

4. The hologram recording device according to claim 3, wherein the lightwave generator comprises a first spatial light phase modulation part and a second spatial light phase modulation part each with light phase modulation elements two-dimensionally arranged therein, and wherein the respective light phase modulation elements of the first spatial light phase modulation part and the second spatial light phase modulation part phase-modulate light in respective polarization direction different from each other.

5. The hologram recording device according to claim 4, wherein, in the respective light phase modulation elements disposed in the same location, when viewed in an optical axis direction, of the first spatial light phase modulation part and the second spatial light phase modulation part, respective amounts of phase modulation of the respective light phase modulation elements are the same.

6. The image reproduction device of claim 1, in combination with a hologram recording device, the hologram recording device comprising:
a lightwave generator that generates, from a lightwave of an object, a lightwave having N parameters for each of one or more pieces of optical information selected from a wavelength range, a polarization direction, and a measurement region, or N combinations thereof, the generated lightwave being two or more in number, the two or more lightwaves having respective phases different from each other; and
an image pickup device that allows the lightwave generated by the lightwave generator enter therein and multiplex-records two or more patterns of interference patterns formed by two lightwaves having the same parameter and different phases, as a multiple hologram,
wherein the two or more patterns of the interference patterns are time- or space-divided and recorded, to thereby record a plurality of multiple holograms, and
wherein the lightwave has a phase different from at least one of lightwaves forming the two or more patterns of the interference patterns recorded in each of a plurality of the multiple holograms.

7. The image reproduction device of claim 1, in combination with a hologram recording device, the hologram recording device comprising:
a lightwave generator that generates, from a lightwave of an object, a lightwave having N parameters for each of one or more pieces of optical information selected from a wavelength range, a polarization direction, and a measurement region, or N combinations thereof, the generated lightwave being two or more in number, the two or more lightwaves having respective phases different from each other; and
an image pickup device that allows the lightwave generated by the lightwave generator enter therein and multiplex-records two or more patterns of interference patterns formed by two lightwaves having the same parameter and different phases, as a multiple hologram,
wherein the two or more patterns of the interference patterns are time- or space-divided and recorded, to thereby record a plurality of multiple holograms, and
wherein the lightwave has a phase different from at least one of lightwaves forming the two or more patterns of the interference patterns recorded in each of a plurality of the multiple holograms,
wherein the lightwave generator comprises a first spatial light phase modulation part and a second spatial light phase modulation part each with light phase modulation elements two-dimensionally arranged therein, and
wherein the respective light phase modulation elements of the first spatial light phase modulation part and the second spatial light phase modulation part phase-modulate light in respective polarization direction different from each other.

8. The image reproduction device of claim 1, in combination with a hologram recording device, the hologram recording device comprising:
a lightwave generator that generates, from a lightwave of an object, a lightwave having N parameters for each of one or more pieces of optical information selected from a wavelength range, a polarization direction, and a measurement region, or N combinations thereof, the generated lightwave being two or more in number, the two or more lightwaves having respective phases different from each other; and
an image pickup device that allows the lightwave generated by the lightwave generator enter therein and multiplex-records two or more patterns of interference patterns formed by two lightwaves having the same parameter and different phases, as a multiple hologram,
wherein the two or more patterns of the interference patterns are time- or space-divided and recorded, to thereby record a plurality of multiple holograms, and
wherein the lightwave has a phase different from at least one of lightwaves forming the two or more patterns of the interference patterns recorded in each of a plurality of the multiple holograms,
wherein the lightwave generator comprises a first spatial light phase modulation part and a second spatial light phase modulation part each with light phase modulation elements two-dimensionally arranged therein, and
wherein the respective light phase modulation elements of the first spatial light phase modulation part and the second spatial light phase modulation part phase-modulate light in respective polarization direction different from each other, and
wherein, in the respective light phase modulation elements disposed in the same location, when viewed in an optical axis direction, of the first spatial light phase modulation part and the second spatial light phase modulation part, respective amounts of phase modulation of the respective light phase modulation elements are the same.

9. The image reproduction device of claim 2, in combination with a hologram recording device, the hologram recording device comprising:
a lightwave generator that generates, from a lightwave of an object, a lightwave having N parameters for each of one or more pieces of optical information selected from a wavelength range, a polarization direction, and a measurement region, or N combinations thereof, the generated lightwave being two or more in number, the two or more lightwaves having respective phases different from each other; and
an image pickup device that allows the lightwave generated by the lightwave generator enter therein and multiplex-records two or more patterns of interference patterns formed by two lightwaves having the same parameter and different phases, as a multiple hologram,
wherein the two or more patterns of the interference patterns are time- or space-divided and recorded, to thereby record a plurality of multiple holograms, and
wherein the lightwave has a phase different from at least one of lightwaves forming the two or more patterns of the interference patterns recorded in each of a plurality of the multiple holograms.

10. The image reproduction device of claim 2, in combination with a hologram recording device, the hologram recording device comprising:
- a lightwave generator that generates, from a lightwave of an object, a lightwave having N parameters for each of one or more pieces of optical information selected from a wavelength range, a polarization direction, and a measurement region, or N combinations thereof, the generated lightwave being two or more in number, the two or more lightwaves having respective phases different from each other; and
- an image pickup device that allows the lightwave generated by the lightwave generator enter therein and multiplex-records two or more patterns of interference patterns formed by two lightwaves having the same parameter and different phases, as a multiple hologram,
- wherein the two or more patterns of the interference patterns are time- or space-divided and recorded, to thereby record a plurality of multiple holograms, and
- wherein the lightwave has a phase different from at least one of lightwaves forming the two or more patterns of the interference patterns recorded in each of a plurality of the multiple holograms,
- wherein the lightwave generator comprises a first spatial light phase modulation part and a second spatial light phase modulation part each with light phase modulation elements two-dimensionally arranged therein, and
- wherein the respective light phase modulation elements of the first spatial light phase modulation part and the second spatial light phase modulation part phase-modulate light in respective polarization direction different from each other.

11. The image reproduction device of claim 2, in combination with a hologram recording device, the hologram recording device comprising:
- a lightwave generator that generates, from a lightwave of an object, a lightwave having N parameters for each of one or more pieces of optical information selected from a wavelength range, a polarization direction, and a measurement region, or N combinations thereof, the generated lightwave being two or more in number, the two or more lightwaves having respective phases different from each other; and
- an image pickup device that allows the lightwave generated by the lightwave generator enter therein and multiplex-records two or more patterns of interference patterns formed by two lightwaves having the same parameter and different phases, as a multiple hologram,
- wherein the two or more patterns of the interference patterns are time- or space-divided and recorded, to thereby record a plurality of multiple holograms, and
- wherein the lightwave has a phase different from at least one of lightwaves forming the two or more patterns of the interference patterns recorded in each of a plurality of the multiple holograms,
- wherein the lightwave generator comprises a first spatial light phase modulation part and a second spatial light phase modulation part each with light phase modulation elements two-dimensionally arranged therein, and
- wherein the respective light phase modulation elements of the first spatial light phase modulation part and the second spatial light phase modulation part phase-modulate light in respective polarization direction different from each other, and
- wherein, in the respective light phase modulation elements disposed in the same location, when viewed in an optical axis direction, of the first spatial light phase modulation part and the second spatial light phase modulation part, respective amounts of phase modulation of the respective light phase modulation elements are the same.

* * * * *